(12) United States Patent
Shinohara et al.

(10) Patent No.: US 10,605,977 B2
(45) Date of Patent: *Mar. 31, 2020

(54) DISPLAY DEVICE AND LIQUID CRYSTAL DISPLAY DEVICE

(71) Applicant: OMRON Corporation, Kyoto (JP)

(72) Inventors: Masayuki Shinohara, Kyoto (JP); Gouo Kurata, Hyogo (JP); Yasuhiro Tanoue, Shiga (JP); Norikazu Kitamura, Osaka (JP); Yuto Mori, Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/012,633

(22) Filed: Jun. 19, 2018

(65) Prior Publication Data

US 2019/0094442 A1 Mar. 28, 2019

(30) Foreign Application Priority Data

Sep. 25, 2017 (JP) ................................ 2017-183796

(51) Int. Cl.
*G02F 1/1335* (2006.01)
*F21V 8/00* (2006.01)
(Continued)

(52) U.S. Cl.
CPC ........... *G02B 6/006* (2013.01); *G02B 6/0036* (2013.01); *G02B 6/0051* (2013.01);
(Continued)

(58) Field of Classification Search
CPC ............. G02F 1/1336; G02F 1/133615; G02F 1/1335; G02F 1/133504; G02F 1/133524; G02F 1/133621; G02F 1/133553; G02F 1/133603; G02F 1/133605; G02F 1/133606; G02F 2201/307; G02F 2203/02; G02B 27/0172; G02B 27/0101; G02B 6/0036;
(Continued)

(56) References Cited

U.S. PATENT DOCUMENTS 5,489,917 A * 2/1996 Ikezaki ................ G09G 3/2011
345/87
10,173,131 B2 * 1/2019 Fujita .................... G02B 6/0036
(Continued)

FOREIGN PATENT DOCUMENTS

JP 2005-338427 A 12/2005

*Primary Examiner* — Thoi V Duong
(74) *Attorney, Agent, or Firm* — Thomas K. Scherer

(57) ABSTRACT

A display device configured for use as a backlight for a display panel that effects presentation via liquid crystals that produce a monochrome image. The display device includes a light guide plate; and a first and a second light source arranged at an edge of the light guide plate. The light guide plate includes: an emission surface; a cluster of first reflective structures configured to reflect light incident thereon from the first light source thereby changing the optical path of the light and causing the light to exit from the emission surface to serve as the backlight; and a cluster of second reflective structures configured to reflect light incident thereon from a second light source thereby changing the optical path of the light and causing the light to exit from the emission surface to effect a predetermined display.

16 Claims, 41 Drawing Sheets

(51) Int. Cl.
*G09G 3/18* (2006.01)
*G09G 3/34* (2006.01)

(52) U.S. Cl.
CPC ......... *G02B 6/0061* (2013.01); *G02B 6/0068* (2013.01); *G02F 1/133524* (2013.01); *G02F 1/133553* (2013.01); *G09G 3/18* (2013.01); *G09G 3/3413* (2013.01)

(58) Field of Classification Search
CPC .. G02B 6/0055; G02B 6/0068; G02B 6/0088; G02B 6/0051; G02B 6/006; G02B 6/00; G02B 6/0028; G02B 6/0031; G02B 6/0035; G02B 6/0018; G02B 6/0053; G02B 6/0073; G02B 2027/0141; G02B 27/145; G02B 5/18; G02B 5/203; G02B 5/3066; G09G 3/3413

See application file for complete search history.

(56) References Cited

U.S. PATENT DOCUMENTS

| | | | | |
|---|---|---|---|---|
| 2009/0073721 | A1* | 3/2009 | Kamikatano | F21V 7/05 362/616 |
| 2011/0149202 | A1* | 6/2011 | Sohn | G02B 6/0036 349/62 |
| 2013/0162932 | A1* | 6/2013 | Han | G02B 6/0058 349/65 |
| 2016/0139321 | A1* | 5/2016 | Tsai | G02B 6/0035 362/607 |

\* cited by examiner

DISPLAY DEVICE AND LIQUID CRYSTAL DISPLAY DEVICE

BACKGROUND

Field

The present invention relates to a liquid crystal display device, and to a display device provided with a light guide plate and used as a backlight for a display panel that effects presentation via liquid crystals that produce a monochrome image.

Related Art

Japanese Patent Publication No. 2005-338427 (published 8 Dec. 2005), for instance, discloses a mobile phone terminal equipped with an image display device; this image display device allows the presentation on a patterned film on the rear surface of the display panel to be viewed in addition to what is shown on the display panel.

More specifically, the image display device 100 disclosed in JP 2005-338427 A is provided with a backlight unit 110 arranged at the rear surface of a normally white liquid crystal display panel 101. The backlight unit 110 includes a light emitting diode 112 arranged at one end of a light guide plate 111 (FIG. 17A, 17B, 17C). The image display device 100 includes a spacer 102 that also functions as the adhesive material and to secure a gap c between the liquid crystal display panel 101 and the backlight unit 110. The gap c includes a slit 121a provided in the side panel 121 of the frame 120 wherethrough the patterned film 103 may be inserted.

A background image, e.g., the image depicted in FIG. 18A is drawn on the patterned film 103. As a result, the liquid crystal display panel 101 in the liquid crystal display device 100 is "normally white" appearing white when the light emitting diode 112 of the backlight unit 110 is deactivated. Therefore, although unclear, a user can make out the image on the patterned film 103 through the liquid crystal display panel 101.

Subsequently, the light emitting diode 112 of the backlight unit 110 is activated as the user performs an operation on the mobile phone terminal and a screen (FIG. 18B) is shown in the display area Ad of the liquid crystal display panel 101. In other words, a battery status display D1, a signal status display D2, the date display D3, and a time display D4 are presented via the liquid crystal display panel 101. At this point, the image on the aforementioned patterned film 103 is also clearly shown simultaneously.

Accordingly, illumination light from the backlight unit 110 passes through the patterned film 103 when the mobile phone terminal is operated; as a consequence the background pattern clearly emerges from the patterned film and the liquid crystals create a black display responsive to the operations of the mobile phone terminal, e.g., showing the battery status and the like.

Depending on the purpose, this type of liquid crystal display device may be useful since the liquid crystal display device can effect presentation via the display panel and effect presentation using a different method.

SUMMARY

However, the above-mentioned existing liquid crystal display device lacks the ability to show the background pattern normally when the liquid crystals that produce a monochrome image effects presentation on the display panel and hide the background pattern when the display panel effects presentation via liquid crystals. In other words, it may be desirable to hide the background pattern in certain cases such as when presenting an image via liquid crystals on the display panel, but to use the background pattern as a warning message that is presented via a process other than via liquid crystals in other cases such as when a malfunction occurs.

A display device according to one or more embodiments of the present invention and a liquid crystal display device according to one or more embodiments of the present invention are capable of presentation on a display panel via liquid crystals and separately via a process other than with liquid crystals independently of when the liquid crystals are used to effect display.

A display device according to one or more embodiments of the present invention is configured for use as a backlight for a display panel that effects presentation via liquid crystals that produce a monochrome image; the display device includes: a light guide plate; and a first and a second light source arranged at an edge of the light guide plate; and the light guide plate including: an emission surface; a cluster of first reflective structures configured to reflect light incident thereon from the first light source thereby changing the optical path of the light and causing the light to exit from the emission surface to serve as the backlight; and a cluster of second reflective structures configured to reflect light incident thereon from a second light source thereby changing the optical path of the light and causing the light to exit from the emission surface to effect a predetermined display.

Given this configuration the display device is provided with a light guide plate 10 and may be used as the backlight for a display panel that effects presentation via liquid crystals that produce a monochrome image. The light guide plate includes a cluster of first reflective structures configured to reflect light incident thereon from the first light source thereby changing the optical path of the light and causing the light to exit from the emission surface to serve as the backlight emitting light toward the display panel.

Therefore, when the first light source is activated the light therefrom enters the light guide plate and is totally reflected inside the light guide plate; the cluster of first reflective structures changes the reflection angle of the light so that the light exits from the emission surface of the light guide plate toward the display panel. Hereby, the display panel effects presentation via liquid crystals that produce a monochrome image. The configuration is the same as for a conventional liquid crystal display device.

In some cases, it is desired for a liquid crystal display device of this type, which presents an image via liquid crystals that produce a monochrome image to be capable of presenting a warning message via a different process when the device is not capable of normal presentation via liquid crystal on the display panel, e.g., when there is a malfunction or the like.

Therefore, according to one or more embodiments, the light guide plate includes cluster of second reflective structures configured to reflect light incident thereon from a second light source thereby changing the optical path of the light and causing the light to exit from the emission surface to effect a predetermined display.

Therefore, when the second light source is activated the light therefrom enters the light guide plate and is totally reflected inside the light guide plate; the cluster of second reflective structures changes the reflection angle of the light so that the light exits from the emission surface of the light guide plate toward the display panel. Hereby, a prescribed display may be affected even if the first light source is not activated as long as the second light source is activated. In other words, the prescribed display EM can appear even when no image is presented on the display panel 2 via the liquid crystals that produce a monochrome image.

Here, the cluster of second reflective structures is configured to effect presentation of a prescribed display in one or more embodiments of the invention. That is, a plurality of clusters of second reflective structures have reflection surfaces with mutually different reflection angles; and the clusters of second reflective structures are combined and arranged to thereby present an image of a line or a plane on the display surface of the display panel. For instance, a single cluster of second reflective structures with an arc-shaped reflection surface may show a portion of a thick circular arc on the display surface of the display panel, and clusters of second reflective structures with arc-shaped reflection surfaces may be arranged so the thick circular arcs are connected. Thus, the display panel can effect presentation of a thick circle pattern on the display surface thereof.

According to one or more embodiments of the present invention, activation of the first light source and the second light source may be controlled to allow the display panel to effect presentation via only the liquid crystals using the cluster of first reflective structures on the light guide plate, effect presentation of only a prescribed display using the cluster of second reflective structures on the light guide plate, or effect both the presentation via the liquid crystals and of the prescribed display.

Accordingly, the display device is capable of presentation on a display panel via liquid crystals and separately via a process other than with liquid crystals independently of when liquid crystals are used to effect display.

According to one or more embodiments of the invention, the second light source includes a plurality of sectional light sources; the cluster of second reflective structures include a plurality of reflection sub-clusters with each reflection sub-cluster configured to correspond to a sectional light source; and each of the reflection sub-clusters presents a different pattern.

Thus, light from the sectional light sources enters the light guide plate when the sectional light sources in the second light source are turned on. The reflection sub-clusters change the reflection angle of the light totally reflected and guided through the light guide plate. This light exits the light guide plate from the emission surface and effects prescribed display of different patterns accordingly.

As a result, it is possible to present a plurality of prescribed displays of mutually different patterns, instead of only one type of prescribed display with one pattern.

According to one or more embodiments, the display device may be configured so that the size of each component in the cluster of first reflective structures in a predetermined region on the light guide plate is smaller than the size of each component in the cluster of first reflective structures outside the predetermined region when the cluster of first reflective structures and the cluster of second reflective structures are mixed together in the predetermined region.

The cluster of first reflective structures and the cluster of second reflective structures may both be provided on the light guide plate. Therefore, this allows both the cluster of first reflective structures and the cluster of second reflective structures to reflect light from the first light source causing the light to exit from the emission surface of the light guide plate toward the display panel when the first light source is activated.

At this point the cluster of first reflective structures are configured to effect presentation on the display panel via liquid crystals that produce a monochrome image. Therefore, while it is preferable that as the backlight the entire light guide plate a provides uniform light to the display panel, the presence of the cluster of second reflective structures increases the brightness within a predetermined region when the cluster of first reflective structures and the cluster of second reflective structures are mixed together in a predetermined region on the light guide plate.

According to one or more embodiments, the display device may be configured so that size of each component in the cluster of first reflective structures in a predetermined region on the light guide plate is smaller than the size of each component in the cluster of first reflective structures outside the predetermined region when the cluster of first reflective structures and the cluster of second reflective structures are mixed together in the predetermined region. The brightness of light from the light guide plate may thus be made uniform.

The display device according one or more embodiments may be configured so that the cluster of second reflective structures is made up of a plurality of recesses drilled into the back surface of the light guide plate where the recesses are spindle shaped when viewed from a direction perpendicular to the emission surface.

As an example, the light guide plate may be a typical acrylic plate and may be produced via injection molding using a die. In this case, if the cluster of second reflective structures is formed from rectangular recesses, there may be cases where the resin does not sufficiently fill the square recesses, losing shape and creating a small sag. This increases the likelihood that the edges of the prescribed display are unclear when the pattern-display reflection patterns 2 effects a prescribed display.

Therefore, the shapes of the recesses in one or more embodiments appear spindle shaped when viewed in a direction perpendicular to the emission surface. Note that here, "spindle shaped" means shaped like a fish where the front and rear tips are narrow with a wider middle, that is, a streamlined shape.

As a result, no small sag occurs in the recesses when the resin flows into the die. Therefore, the prescribed display presented has clear edges.

The display device according to one or more embodiments may be configured so that a reflection surface in the cluster of second reflective structures is parallel to the direction along which the birefringence of the light guide plate changes.

Thus, the reflection surfaces in the cluster of second reflective structures are parallel to the flow of resin when producing a light guide plate via injection molding. This increases the mobility of the resin and therefore prevents small sags on the reflection surfaces in the cluster of second reflective structures thus making it possible to effect a prescribed display with clear edges.

A display device according to one or more embodiments may be configured such that the first light source and the second light source emit light of mutually different colors.

Hereby, the image presented on the display panel by the liquid crystals that produce a monochrome image is a different color from the prescribed display. As a result, the prescribed display may be made more noticeable than the presentation on the display panel via liquid crystals that produce a monochrome image when, for instance, the prescribed display is used to provide a warning message.

A display device according to one or more embodiments may be configured such that the cluster of second reflective structures on the light guide plate is configured to present the prescribed display on the emission surface of the light guide plate with the prescribed display configured for external viewing through a display panel.

Thus, it is possible to visually confirm the prescribed display presented on the emission surface of the light guide plate via the display panel when viewing the display panel.

A display device according to one or more embodiments may be configured such that the cluster of second reflective structures on the light guide plate present the prescribed display in front of a display panel.

It is thus possible to form a stereoscopic image of the prescribed display in front of the surface of the display panel. Note that as previously described a plurality of clusters of second reflective structures have reflection surfaces with mutually different reflection angles; and the clusters of second reflective structures may be combined and arranged to thereby present a two-dimensional image of a line or a plane on the display panel. Moreover, a plurality of clusters of second reflective structures have reflection surfaces with mutually different reflection angles; and the clusters of second reflective structures may be combined and arranged to thereby present a three-dimensional image of a line or a plane in front of the display panel.

A display device according to one or more embodiments may include a controller configured to control the activation of the first light source and the second light source.

The controller may control turning on the first light source and the second light source to allow the display panel to effect presentation via only the liquid crystals using the cluster of first reflective structures on the light guide plate, effect presentation of only a prescribed display using the cluster of second reflective structures on the light guide plate, or effect both the presentation via the liquid crystals and of the prescribed display.

In the display device according to one or more embodiments, the controller may be configured to switch between and activate the first light source and the second light source.

Such a configuration allows switching between the display panel effecting presentation via only the liquid crystals using the cluster of first reflective structures and effecting presentation of only a prescribed display using the cluster of second reflective structures.

In the display device according to one or more embodiments, the controller may be configured to activate the first light source and the second light source simultaneously.

Hereby, the display panel effects presentation with the activated first light source and the cluster of second reflective structures effects presentation of the prescribed display with the activated second light source.

A liquid crystal display device according to one or more embodiments of the invention is provided with a display device configured as aforementioned to serve as a backlight, and a display panel arranged in front of the backlight and configured to effect presentation via liquid crystals that produce a monochrome image.

Hereby is provided a liquid crystal display device with a display device as the backlight; and the display device is capable of presentation on a display panel via liquid crystals and separately via a process other than with liquid crystals independently of when liquid crystals are used to effect display.

The liquid crystal display device according to one or more embodiments is configured with a display panel driven in normally white mode.

A display panel driven in normally white mode means that the liquid crystals are transmissive with no power supplied to the display panel. Therefore, this allows the prescribed display to pass through the display panel while no power is supplied thereto when the cluster of second reflective structures effects presentation of the prescribed display with the activated second light source. Therefore, a user sees the relevant prescribed display even when the presentation via liquid crystals does not appear on the display panel.

A liquid crystal display device according to one or more embodiments of the invention may be provided with a diffusion plate configured to diffuse light may be provided between the light guide plate and the display panel.

Hereby, the diffusion plate increases the uniformity of brightness of light exiting from the emission surface of the light guide plate and entering the display panel to effect presentation on the display panel with the activated first light source.

A liquid crystal display device according to one or more embodiments of the invention may be provided with a reflection plate arranged at the rear surface of the light guide plate which is opposite the display panel, the reflection plate configured to return light leaving the light guide plate from the rear surface back to the light guide plate.

Hereby, the reflection plate returns light leaking from the rear surface of the light guide plate back to the light guide plate thus increasing the brightness of light entering the display panel when effecting presentation on the display panel with the activated first light source.

Effects

One or more embodiments of the present invention provide a liquid crystal display device capable of presentation on a display panel via liquid crystals and separately via a process other than with liquid crystals independently of when liquid crystals are used to effect display.

DETAILED DESCRIPTION

Embodiments of the present invention are described below with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Possible Applications

Figure 1:
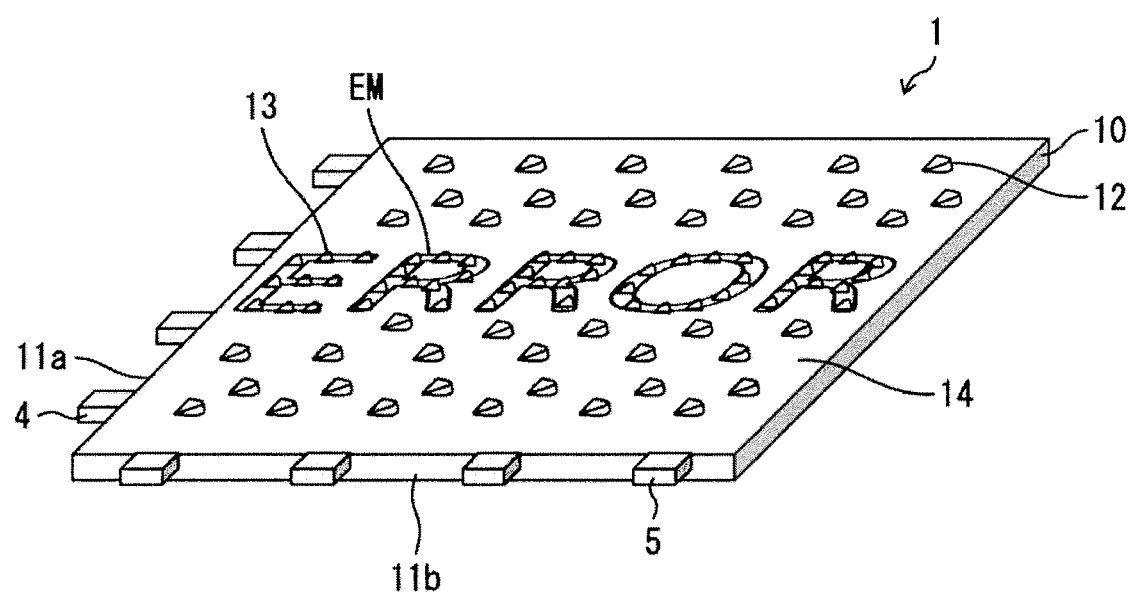
FIG. 1 depicts one possible form of the display device according to one or more embodiments of the present invention and more specifically is a perspective view illustrating a configuration of a cluster of first reflective structures and a cluster of second reflective structures on a light guide plate in the display device.
Figure 2A:
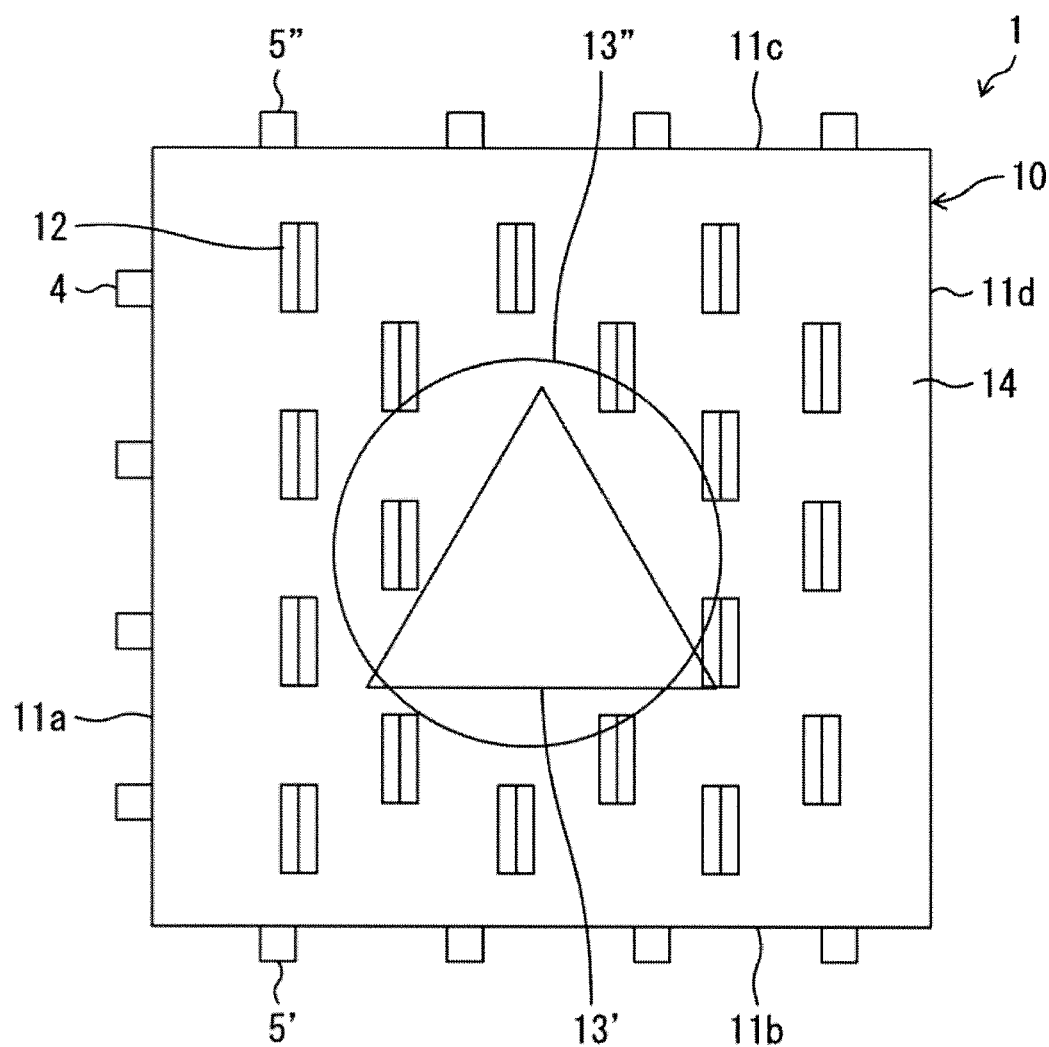
FIG. 2A depicts one possible form of the display device according to one or more embodiments of the present invention and is a plan view of the display device provided with a sub-cluster of reflective structures within a cluster of second reflective structures having at least two types of reflective structures.
Figure 2B:
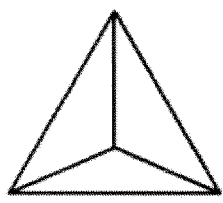
FIG. 2B is a perspective view illustrating the shapes of components in the aforementioned sub-cluster of reflective structures.
Figure 2B:
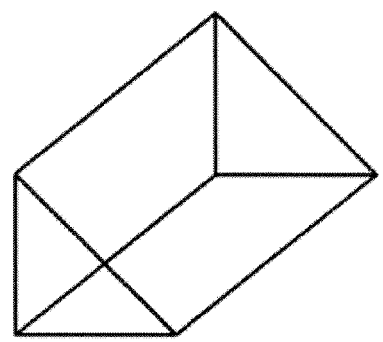

First, an example situation where one or more embodiments of the present invention may be adopted is describes on the basis of FIG. 1, FIG. 2A, and FIG. 2B. FIG. 1 depicts one possible form of the display device according to the present invention; more specifically, FIG. 1 is a perspective view illustrating a configuration of a cluster of first reflective structures and a cluster of second reflective structures on a light guide plate 10 in the display device 1. FIG. 2A depicts one possible form of the display device according to one or more embodiments of the present invention and is a plan view of the display device provided with a sub-cluster of reflective structures within a cluster of second reflective structures having at least two types of reflective structures. FIG. 2B is a perspective view illustrating the shapes of components in the aforementioned sub-cluster of reflective structures.

As illustrated in FIG. 1, a display device 1 according to one or more embodiments of the present invention is provided with a light guide plate 10. The display device 1 is used as the backlight for a display panel that effects presentation via liquid crystals that produce a monochrome image. A display device 1 is provided with a liquid crystal display LED 4 and a pattern display LED 5; the liquid crystal display LED 4 is provided at a first side edge 11a which is one edge of the light guide plate 10, and the pattern display LED 5 is provided at a second side edge 11b which is another side edge of the light guide plate 10.

The light guide plate 10 includes liquid-crystal reflection patterns 12 and pattern-display reflection patterns 13 formed thereon. The liquid-crystal reflection patterns 12 change the optical path of light entering the light guide plate from the liquid crystal display LED 4 via reflection. The pattern-display reflection patterns 13 change the optical path of light entering the light guide plate from the pattern display LED 5 via reflection and cause the light to exit from an emission surface 14 to effect a prescribed display EM.

Note that the liquid crystal display LED 4 functions as a first light source and the pattern display LED 5 serves as a second light source. The liquid-crystal reflection patterns 12 serve as the cluster of first reflective structures; and the pattern-display reflection patterns 13 serve as the cluster of second reflective structures.

The display device thusly configured includes pattern-display reflection patterns 13 formed on the light guide plate 10. The pattern-display reflection patterns 13 reflect light entering the second side edge 11b of the light guide plate 10 from the pattern display LED 5 to change the optical path thereof causing the light to exit from the emission surface 14 and effect a prescribed display EM.

Therefore, when the pattern display LED 5 is activated the light from the pattern display LED 5 enters the light guide plate 10 and is totally reflected inside the light guide plate 10; the pattern-display reflection patterns 13 in the light guide plate change the reflection angle of the light so that the light exits from the emission surface 14 of the light guide plate 10 toward the display panel 2. Thus, activating the pattern display LED 5 effects the prescribed display EM even if the liquid crystal display LED 4 is not turned on. In other words, the prescribed display EM can appear even when no image is presented on the display panel 2 via the liquid crystals that produce a monochrome image.

In one or more embodiments, the pattern-display reflection patterns 13 are formed to effect a prescribed display EM. That is, a plurality of pattern-display reflection patterns 13 have reflection surfaces with mutually different reflection angles; the pattern-display reflection patterns 13 are combined and arranged to thereby present an image of a line or a plane on the display surface of the display panel. For instance, a single pattern-display reflection pattern 13 with an arc-shaped reflection surface may show a portion of a thick circular arc on the display surface of the display panel, and other pattern-display reflection patterns 13 with arc-shaped reflection surfaces may be arranged so the thick circular arcs are connected. Thus, the display panel can effect presentation of a thick circle pattern on the display surface thereof.

In one or more embodiments, controlling activation of the liquid crystal display LED 4 and the pattern display LED 5 makes it possible for the display panel to effect presentation via only the liquid crystals using the pattern-display reflection patterns 13 on the light guide plate 10, effect presentation of only the prescribed display EM using the pattern-display reflection patterns 13 on the light guide plate 10, or effect both the presentation via the liquid crystals and of the prescribed display EM.

Accordingly, the display device 1 is capable of presentation on a display panel via liquid crystals and separately via a process other than with liquid crystals independently of when liquid crystals are used to effect display.

Additionally, the pattern display LED 5 in the display device 1 according to one or more embodiments includes a plurality of sectional light sources 5', 5" as illustrated in FIG. 2A. The cluster of second reflective structures include a plurality of reflection sub-clusters 13', 13" corresponding to the sectional light sources 5', 5". The sectional light sources 5', 5" are formed at mutually opposite side edges 11b, 11c of the light guide plate 10. Additionally, the triangle depicted in FIG. 2A indicates the region where one of the reflection sub-clusters 13' are formed, while the circle indicates where another of the reflection sub-clusters 13" are formed. The shapes of the each of the elements in the reflection sub-clusters 13', 13" may be tetrahedrons or triangular prisms as illustrated in FIG. 2B. The reflection sub-clusters 13', 13" are therefore each capable of presenting different patterns.

Thus, light from the sectional light sources 5', 5" enter the light guide plate 10 when the sectional light sources 5', 5" in the pattern display LED 5 are turned on. The reflection sub-clusters 13', 13" change the reflection angle of the light totally reflected and guided through the light guide plate 10; this light exits the light guide plate 10 from the emission surface 14 and effects prescribed display of different patterns accordingly.

Consequently, it is thus possible to present a plurality of mutually different patterns, instead of only one type of predetermined pattern.

Note that another sectional light source may be provided at the side edge 11d of the light guide plate 10 opposite the liquid crystal display LED 4 with another reflection sub-cluster provided in the light guide plate 10 corresponding thereto.

Configuration Examples

First Embodiment

Figure 3A:
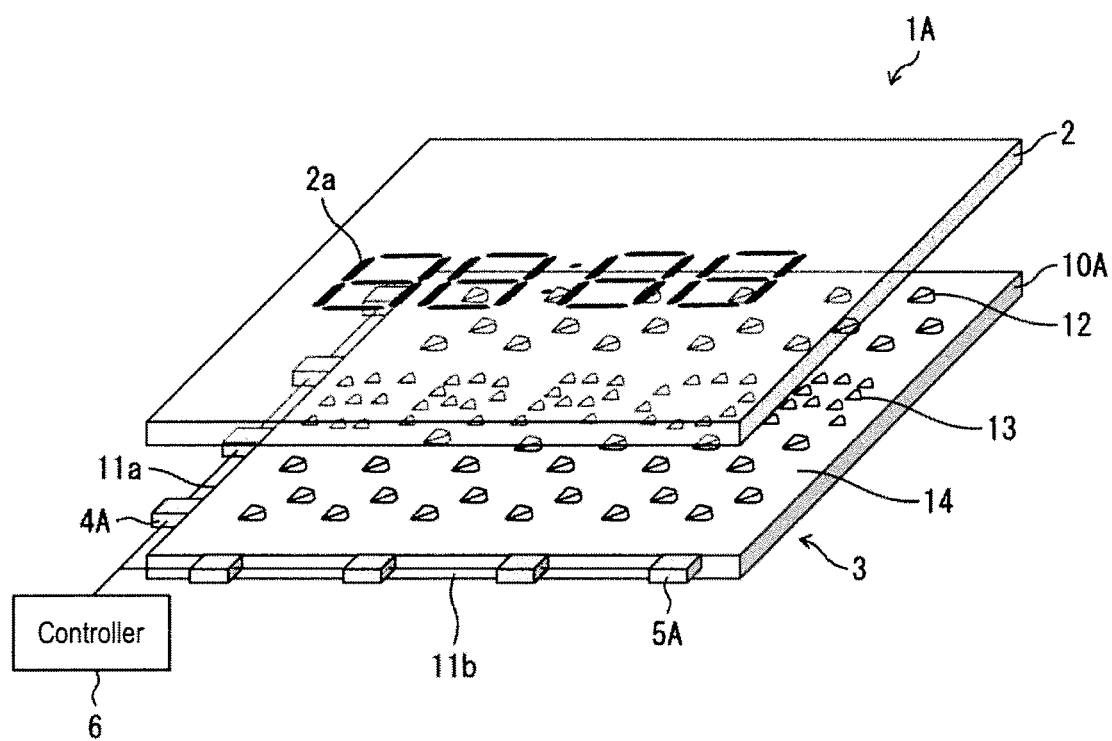
FIG. 3A depicts a liquid crystal display device according to a first embodiment of the present invention and more specifically is a perspective view illustrating a configuration of a cluster of first reflective structures and a cluster of second reflective structures on the light guide plate of the backlight.
Figure 3B:
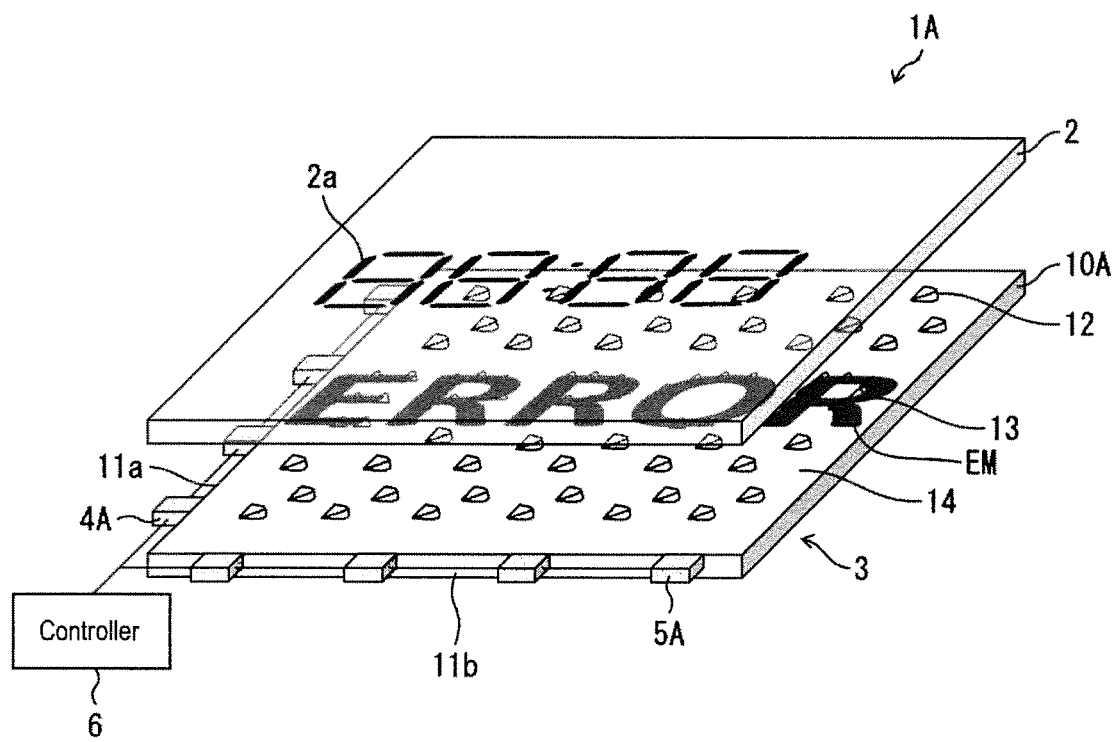
FIG. 3B is a perspective view illustrating presentation by the display panel, and a prescribed display via the cluster of second reflective structures.
Figure 4:
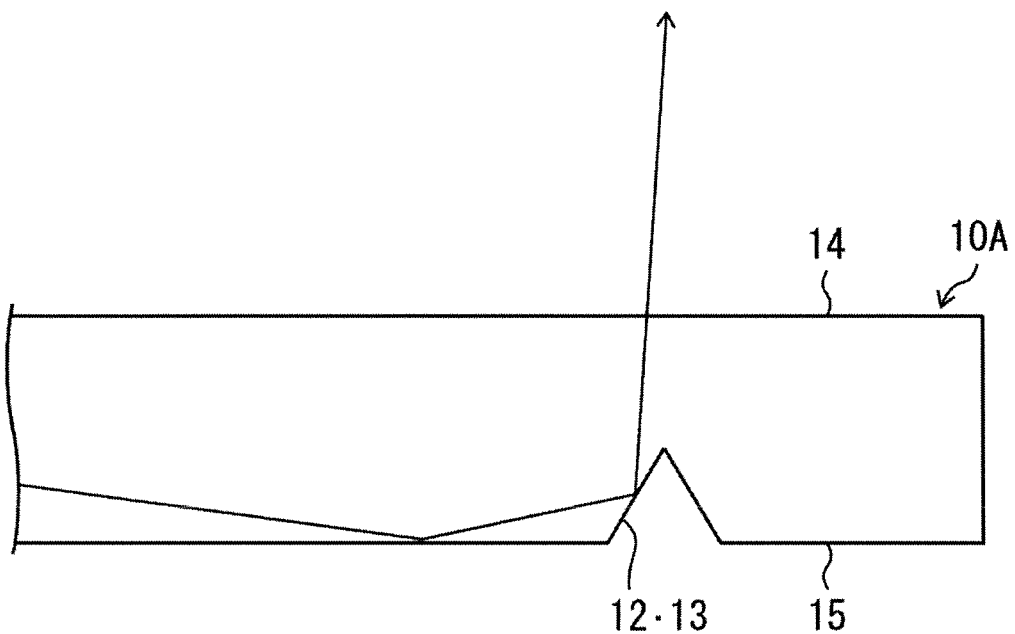
FIG. 4 is a cross-sectional view illustrating when the clusters of first reflective structures and second reflective structures formed on the light guide plate changes an optical path.

An example configuration of a liquid crystal display device 1A according to one or more embodiments is described with reference to FIGS. 3A and 3B, and FIG. 4. FIG. 3A depicts a first embodiment of a liquid crystal display device 1A. More specifically, FIG. 3A is a perspective view illustrating a configuration of liquid-crystal reflection patterns 12 and pattern-display reflection patterns 13 on the light guide plate 10A of the backlight 3. FIG. 3B is a perspective view illustrating a presentation via liquid crystals (hereinafter, liquid crystal display 2a) and a prescribed presentation via the pattern-display reflection patterns 13 (hereinafter, prescribed display EM) on the display panel 2. FIG. 4 is a cross-sectional view illustrating when the liquid-crystal reflection patterns 12 and the pattern-display reflection patterns 13 formed on the light guide plate 10A changes an optical path.

As illustrated in FIG. 3A, the liquid crystal display device 1A of the first embodiment is provided with a display panel 2 and a backlight 3 which includes a light guide plate 10A. The backlight 3 includes the functions of the above-mentioned display device 1.

Figure 15A:
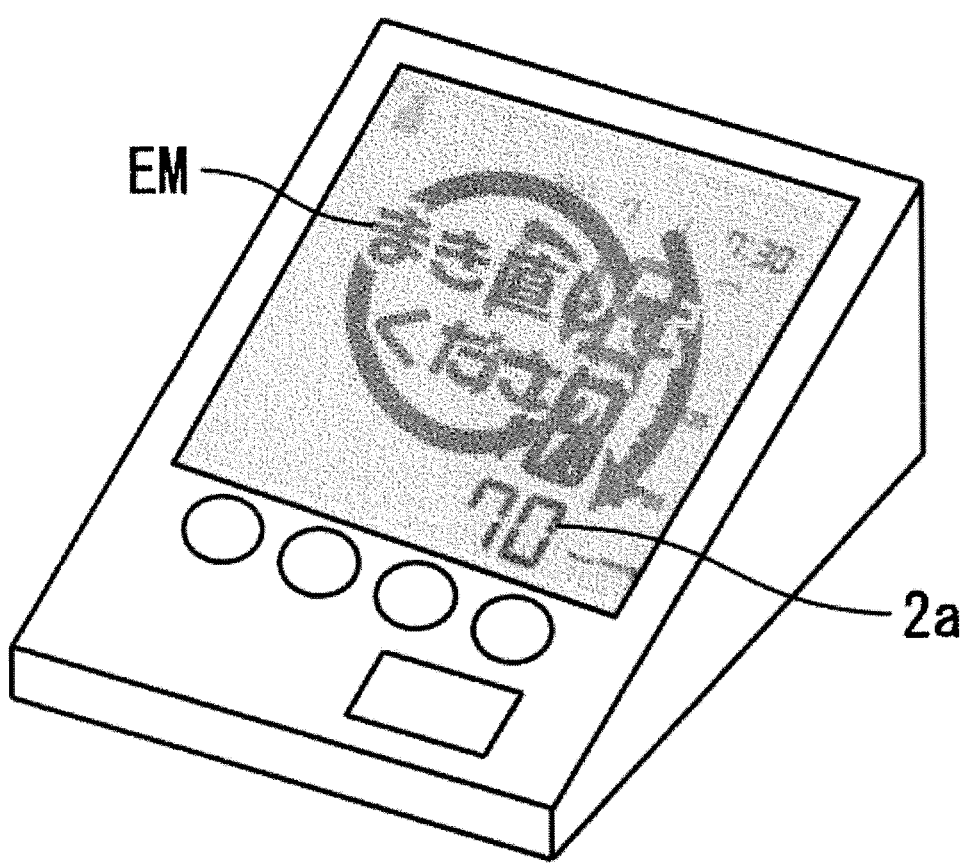
FIG. 15A illustrates a liquid crystal display device according to a fifth embodiment of the present invention and more specifically is a perspective view illustrating a configuration of an upper arm blood pressure meter which is an example of adopting the liquid crystal display device in health-related equipment.
Figure 15B:
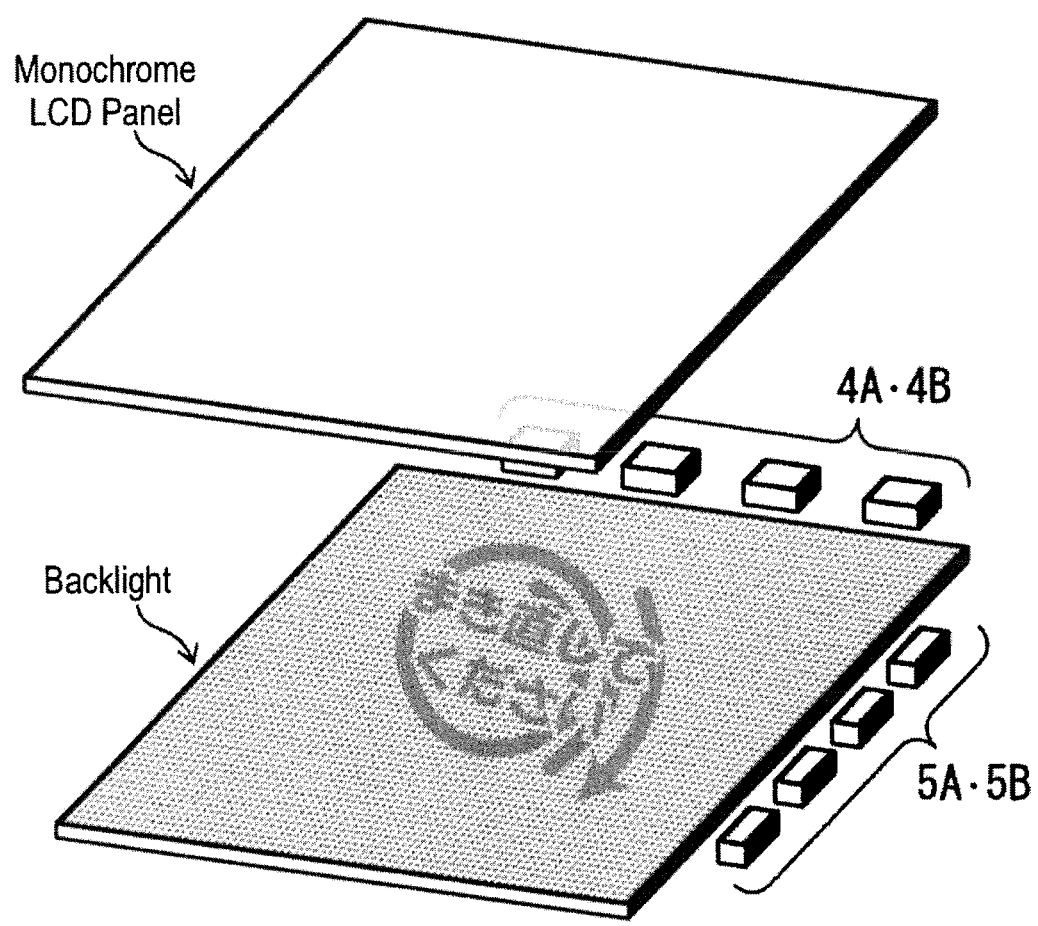
FIG. 15B is an exploded perspective view illustrating a configuration of the liquid crystal display device in the upper arm blood pressure meter.
Figure 15C:
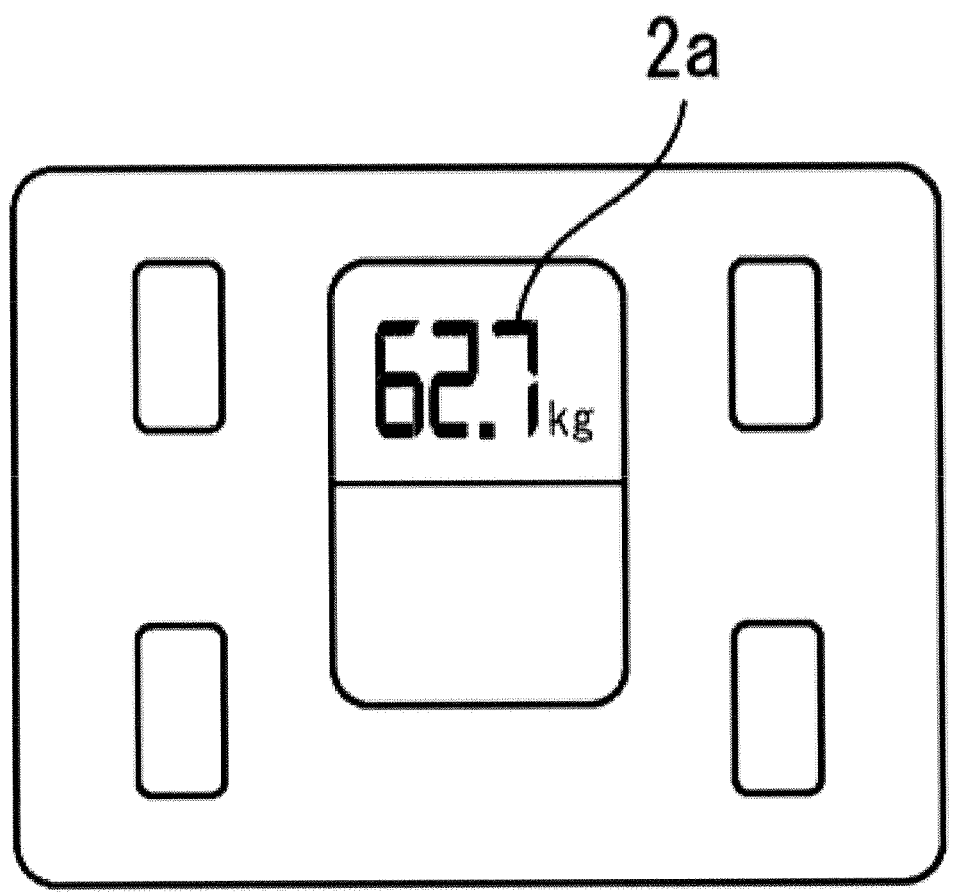
FIG. 15C is a plan view illustrating a configuration of a body composition meter which is an example of adopting the liquid crystal display device in health-related equipment.

In the first embodiment the display panel 2 effects liquid-crystal display 2a via liquid crystals that produce a monochrome image; for example, the display panel 2 is configured in normally white mode. In other words, the liquid crystal display device 1A and display panel 2 of the first embodiment may be adopted for use in health-related equipment such as an upper arm blood pressure meter, or in an electrical home appliance such as a rice cooker as illustrated in FIGS. 15A, 15B, and 15C and in FIGS. 16A, 16B, 16C, and 16D. The liquid crystal display device 1A used in these kinds of devices may provide a segmented display via the liquid crystals that produce a monochrome image, presenting for instance the blood pressure measured, a reservation time, or the like. This kind of liquid-crystal display 2a presents specific content via the liquid crystals that produce a monochrome image and effects presentation via a simple mechanism. Therefore, preferably, for instance, an error message is presented via a different process than the liquid-crystal display 2a on the display panel 2 when the display panel 2 or the like becomes defective; this makes the device more useful.

The liquid crystal display device 1A according to the first embodiment is used for such a purpose.

As illustrated in FIG. 3A and FIG. 3B and as previously described, the display panel 2 effects liquid-crystal display 2a via liquid crystals that produce a monochrome image; therefore, similarly to a typical liquid crystal display device, the backlight 3 in the liquid crystal display device 1A of the first embodiment includes the light guide plate 10A, and the liquid crystal display LED 4A along a first side edge 11a of the light guide plate 10A to serve as a first light source.

The light guide plate 10A includes liquid-crystal reflection patterns 12 formed thereon to function as a cluster of first reflective structures. The liquid-crystal reflection patterns 12 reflect light entering the light guide plate 10A from the liquid crystal display LED 4A at the first side edge 11a to change the optical path thereof and cause the light to exit from the emission surface 14 of the light guide plate 10A towards the display panel 2.

Therefore, light emitted from the liquid crystal display LED 4A enters the light guide plate 10A from the first side edge 11a when the liquid crystal display LED 4A is turned on. The light incident on the light guide plate 10A from the first side edge 11a travels through the light guide plate 10A via total reflection as illustrated in FIG. 4, changes direction on reflection from the liquid crystal reflection patterns 12 and exits towards the aforementioned display panel 2 from the emission surface 14 of the light guide plate 10A. The display panel 2 thusly presents the liquid-crystal display 2a via the liquid crystals that produce a monochrome image as illustrated in FIG. 3A and FIG. 3B.

It is desirable in some cases for a liquid crystal display device of this type, which presents an image via liquid crystals that produce a monochrome image to be capable of presenting a warning message via a different process when the device is not capable of normal presentation via liquid crystal on the display panel, e.g., when there is a malfunction or the like.

As illustrated in FIG. 3A, the light guide plate 10A includes pattern-display reflection patterns 13 formed thereon to function as a cluster of second reflective structures. The pattern-display reflection patterns 13 reflect the light entering the second side edge 11b of the light guide plate 10A from the pattern display LED 5 to change the optical path thereof causing the light to exit from the emission surface 14 and effect a prescribed display EM. Note that the pattern display LED 5 serves as the second light source. Note that on a square light guide plate 10A the second the side edge 11b may be any side edge regardless of how the first side edge 11a is disposed. However, considering the direction along which the pattern-display reflection patterns 13 is formed (later described), the second side edge 11b is preferably orthogonal to the first side edge 11a and the emission surface 14. In addition, the prescribed display EM may be any kind of presentation such as an error message, an alert, a comment or the like.

Therefore, light from the pattern display LED 5 enters the light guide plate 10A when the pattern display LED 5 is turned on as illustrated in FIG. 3A and FIG. 3B. The light incident on the light guide plate 10A travels through the light guide plate 10A as illustrated in FIG. 4 via total reflection, changes direction on reflection from the pattern-display reflection patterns 13, and exits towards the aforementioned display panel 2 from the emission surface 14 of the light guide plate 10A. Thus, activating the pattern display LED 5A effects the prescribed display EM even if the liquid crystal display LED 4A is not turned on. In other words, the prescribed display EM can appear even when the liquid-crystal display 2a does not appear on the display panel 2 via the liquid crystals that produce a monochrome image. This prescribed display EM is effected by the emission surface 14 of the light guide plate 10A as illustrated in FIG. 3B. The prescribed display EM passes through the display panel 2 and can be seen externally. Thus, it is possible to visually confirm the prescribed display EM presented on the emission surface 14 of the light guide plate 10A via the display panel 2 when viewing the display panel 2. In this case, the liquid crystal display device 1A of one or more embodiments is configured with a display panel 2 driven in normally white mode. A normally white display panel 2 means that the liquid crystals are transmissive with no power supplied to the display panel 2. Therefore, the prescribed display EM passes through the inactive display panel 2 when the pattern-display reflection patterns 13 effect the prescribed display EM when the pattern display LED 5A is turned on. Therefore, a user sees the relevant prescribed display EM even when the liquid-crystal display 2a does not appear on the display panel 2 via the liquid crystals that produce a monochrome image.

Note that while the liquid crystal display device 1A of the first embodiment may be configured with a display panel 2 driven in normally white mode, embodiments of the present invention are not limited thereto. In other words, normally black means that the liquid crystals are transmissive when power is supplied to the display panel 2. Therefore, the prescribed display EM is passes through the activated display panel 2 when the pattern-display reflection patterns 13 effect the prescribed display EM when the pattern display LED 5A is turned on.

Figure 5A:
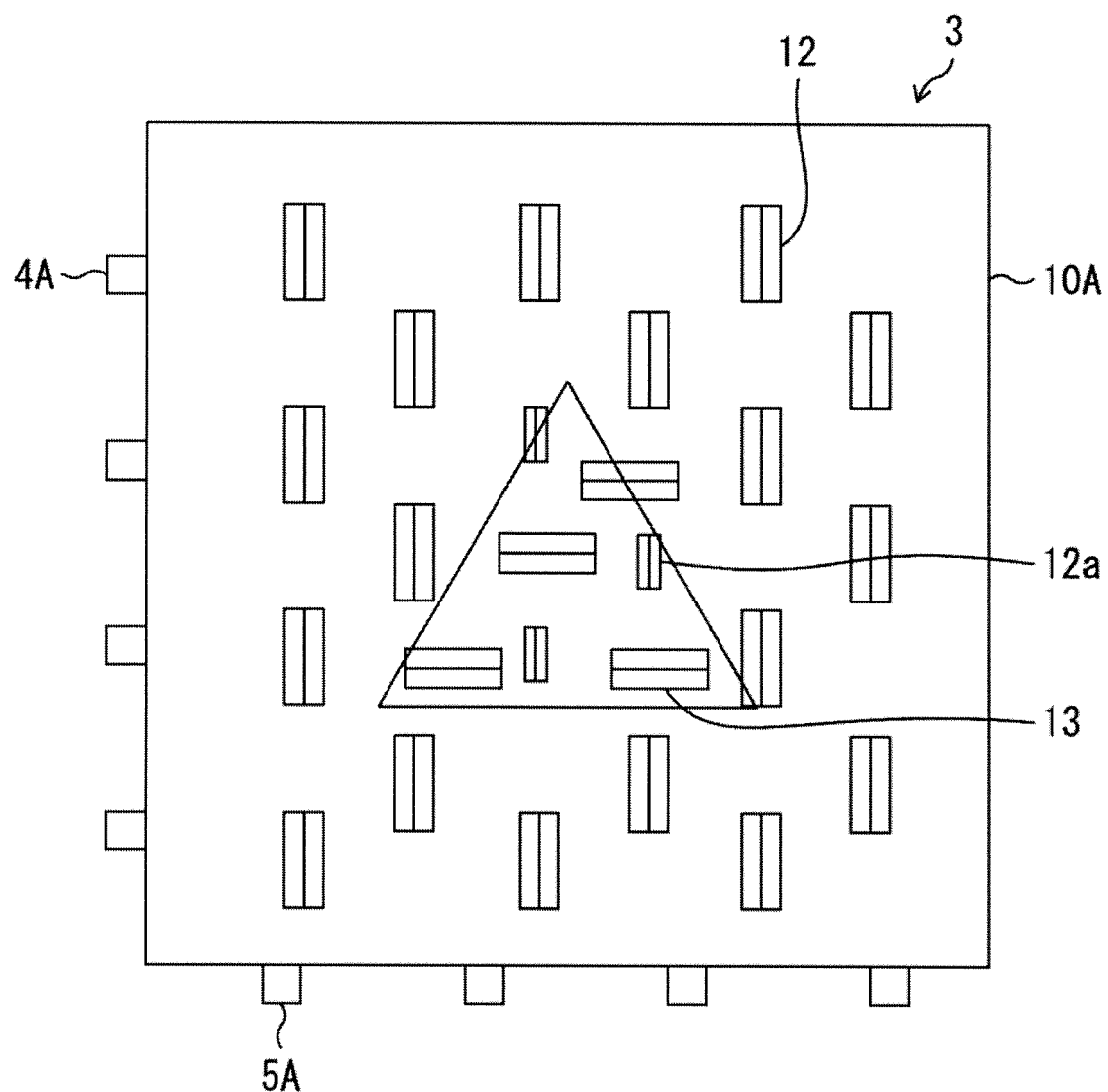
FIG. 5A is a plan view illustrating the shapes of the clusters of first reflective structures and second reflective structures formed on the light guide plate.
Figure 5B:
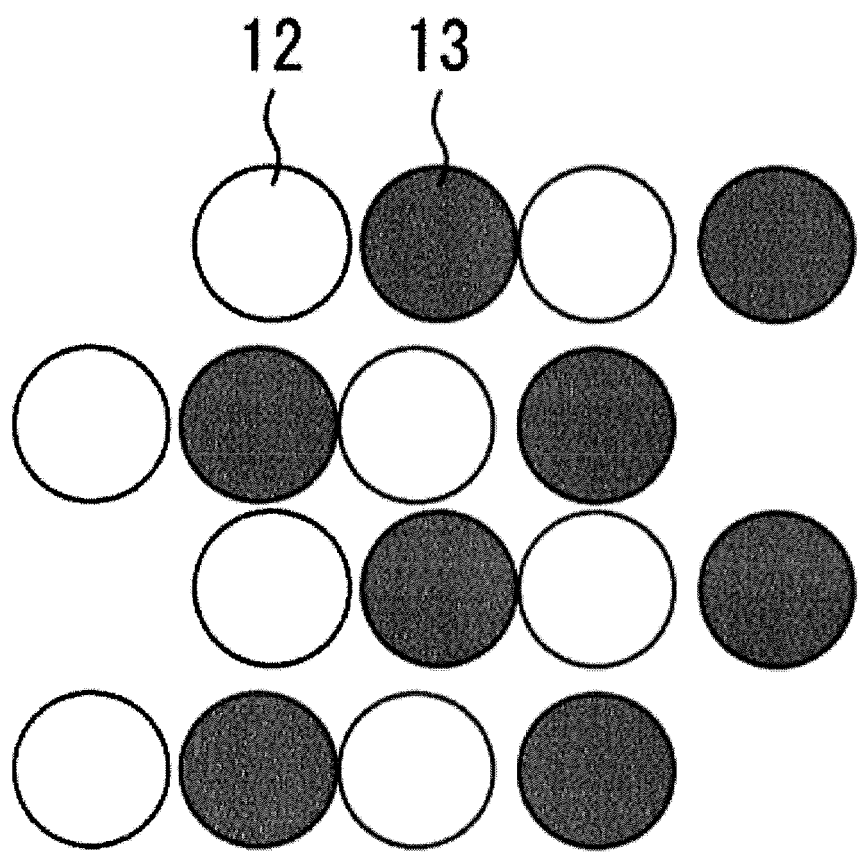
FIG. 5B is a schematic plan view illustrating the staggering of the clusters of first reflective structures and second reflective structures.
Figure 6:
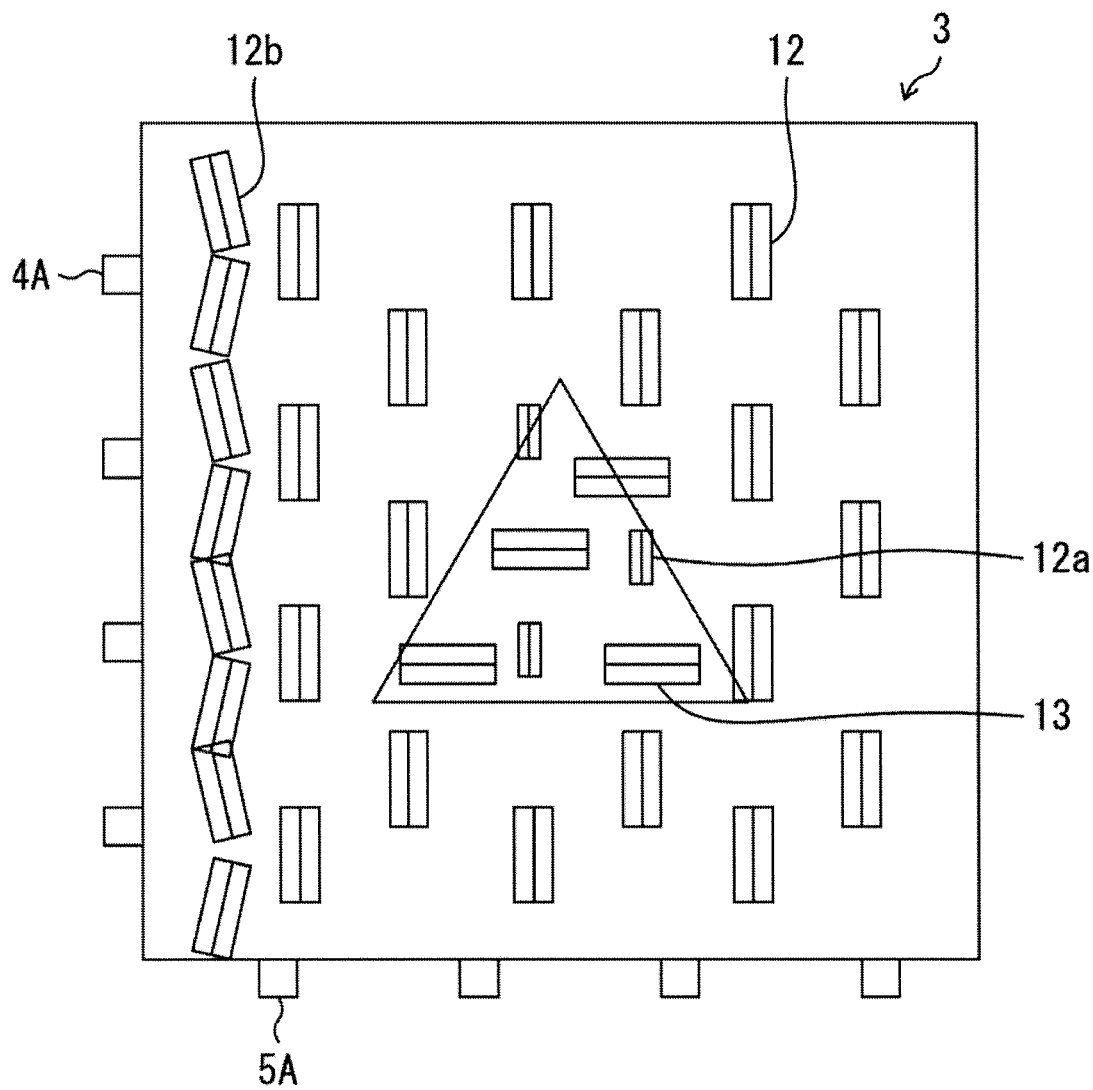
FIG. 6 is a plan view illustrating an example of modifying the arrangement of the cluster of first reflective structures on the light guide plate.

Here, the liquid-crystal reflection patterns 12 and pattern-display reflection patterns 13 of the first embodiment are described based on FIGS. 5A and 5B, and FIG. 6. FIG. 5A is a plan view illustrating the shape of the liquid-crystal reflection patterns 12 and the pattern-display reflection patterns 13 formed on the light guide plate 10A. FIG. 5B is a perspective plan view illustrating the staggered arrangement of the liquid-crystal reflection patterns 12 of the pattern-display reflection patterns 13. FIG. 6 is a plan view illustrating an example of modifying the arrangement of the liquid-crystal reflection patterns 12 on the light guide plate 10A.

As illustrated in FIG. 5A and the aforementioned FIG. 4, the liquid-crystal reflection patterns 12 may be formed of the back surface 15 of the light guide plate 10A. In this manner, in the first embodiment the liquid-crystal reflection patterns 12 serve as a cluster of first reflective structures that reflect the light totally reflected and guided through the light guide plate 10A, changing the optical path thereof and causing the light to exit from the emission surface 14. The liquid-crystal reflection patterns 12 may be a plurality of pointed prism shaped recesses drilled into the back surface 15 of the light guide plate 10A. However, the liquid-crystal reflection patterns 12 serving as A cluster of first reflective structures are not limited to prismatic shapes and may be a plurality of printed dots.

Pattern-display reflection patterns 13 are also formed on the back surface 15 of the light guide plate 10A as illustrated in FIG. 5A and the aforementioned FIG. 4. The pattern-display reflection patterns 13 serve as a cluster of second reflective structures that reflect the light totally reflected and guided through the light guide plate 10A, changing the optical path thereof and causing the light to exit from the emission surface 14. The pattern-display reflection patterns 13 may also be a plurality of pointed prism shaped recesses drilled into the back surface 15 of the light guide plate 10A. Note that in the first embodiment the pattern-display reflection patterns 13 must reflect the light guided through the light guide plate 10A in order to effect the prescribed display EM. The pattern-display reflection patterns 13 therefore require a complex reflect sun surface; therefore, the pattern-display reflection patterns 13 are preferably a plurality of pointed prism shapes drilled into the back surface 15 of the light guide plate 10A.

Here, the pointed ridges that create the prism-shaped liquid-crystal reflection patterns 12 are preferably orthogonal to the light entering from the liquid crystal display LED 4A; and, the pointed ridges that create the prism-shaped pattern-display reflection patterns 13 are preferably orthogonal to the light entering from the pattern display LED 5A. Thus, this ensures that light from the liquid crystal display LED 4A and the pattern display LED 5A can be efficiently reflected.

As previously described, both the liquid-crystal reflection patterns 12 and the pattern-display refraction patterns 13 are arranged on the back surface 15 of the light guide plate 10A in the first embodiment. Therefore, this makes it possible for the pattern-display reflection patterns 13 to also reflect light from the liquid crystal display LED 4A and cause the light to exit from the emission surface 14 of the light guide plates 10A toward the display panel 2 when the liquid crystal display LED 4A is activated and the liquid-crystal reflection patterns 12 reflect the light therefrom causing the light to exit from the emission surface 14 toward the display panel 2.

At this point, the liquid-crystal reflection patterns 12 effect liquid crystal display 2a on the display panel 2 via the liquid crystals that produce a monochrome image. Therefore, it is preferable that the entire light guide plate 10A provides uniform light to the display panel 2 while serving as a part of the backlight 3. However, the presence of pattern-display reflection patterns 13 increases the brightness in a predetermined region when the liquid-crystal reflection patterns 12 and the pattern-display reflection patterns 13 are mixed together in said predetermined region of the light guide plate 10A as illustrated by the solid triangle depicted in FIG. 5A.

Given that the liquid-crystal reflection patterns 12 and the pattern-display reflection patterns 13 may be mixed together in a predetermined area on the liquid light guide plate 10A, the first embodiment ensures that the liquid-crystal reflection patterns 12 inside the predetermined area are smaller than the liquid-crystal reflection patterns 12 outside the predetermined area in these cases. The brightness of light from the light guide plate 10A may thus be made uniform.

The liquid-crystal reflection patterns 12 and the pattern-display reflection patterns 13 may be staggered in the first embodiment when the liquid-crystal reflection patterns 12 and the pattern-display reflection patterns 13 are mixed together in a predetermined area on the light guide plate 10A as illustrated in FIG. 5B. This increases the degree of the density at which the liquid-crystal reflection patterns 12 and the pattern-display reflection patterns 13 may be mixed together in a predetermined area on the light guide plate 10A.

Note that the liquid-crystal reflection patterns 12 close to the liquid crystal display LED 4A are not arranged orthogonal relatives to liquid crystal display LED 4A but are arranged in a V-shape oriented toward a liquid crystal display LED 4A as illustrated in FIG. 6. In other words, two liquid-crystal reflection patterns 12 that are close to liquid crystal display LED 4A are oriented such that a centerline orthogonal to the ridges of the two liquid-crystal reflection patterns 12 is oriented toward the nearby liquid crystal display LED 4A. Thusly arranged, this prevents the area of the emission surface 14 of the light guide plate 10A that is near the liquid crystal display LED 4A from being excessively bright or excessively dark, i.e., this prevents on even brightness from occurring.

The shape of the recesses in the pattern-display reflection patterns 13 in the liquid crystal display device 1A are preferably spindle shaped when viewed from a direction perpendicular to the emission surface 14 of the light guide plate 10A in the first embodiment.

Figure 7A:
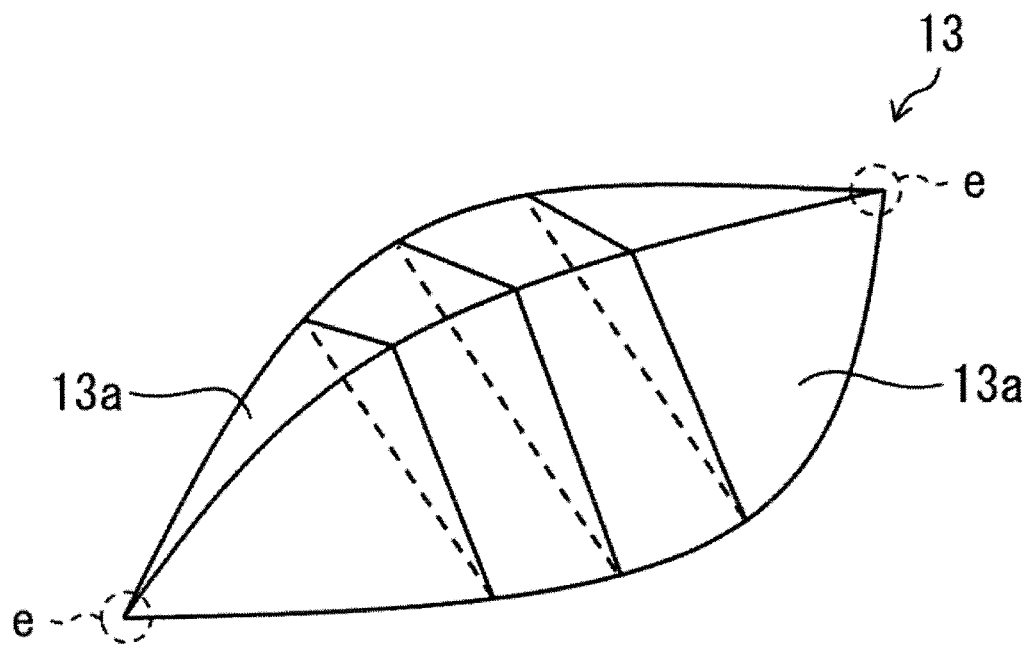
FIG. 7A is a perspective view illustrating the shapes of clusters of second reflective structures formed on the light guide plate.
Figure 7B:
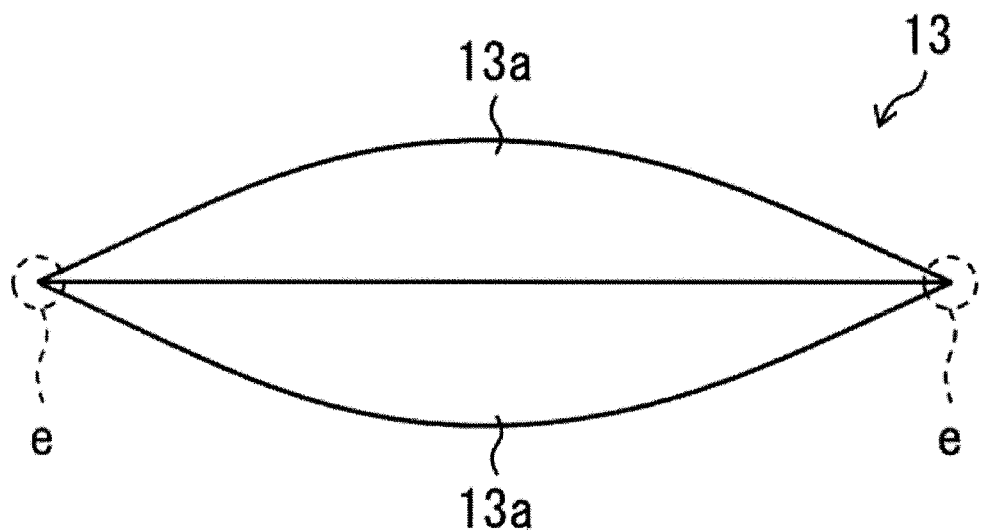
FIG. 7B is a plan view thereof.
Figure 7C:
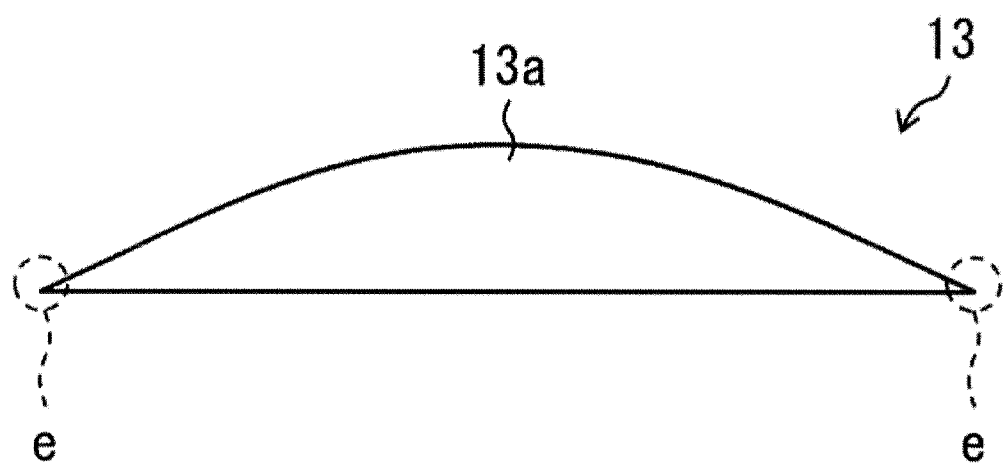
FIG. 7C is a front view thereof.
Figure 7D:
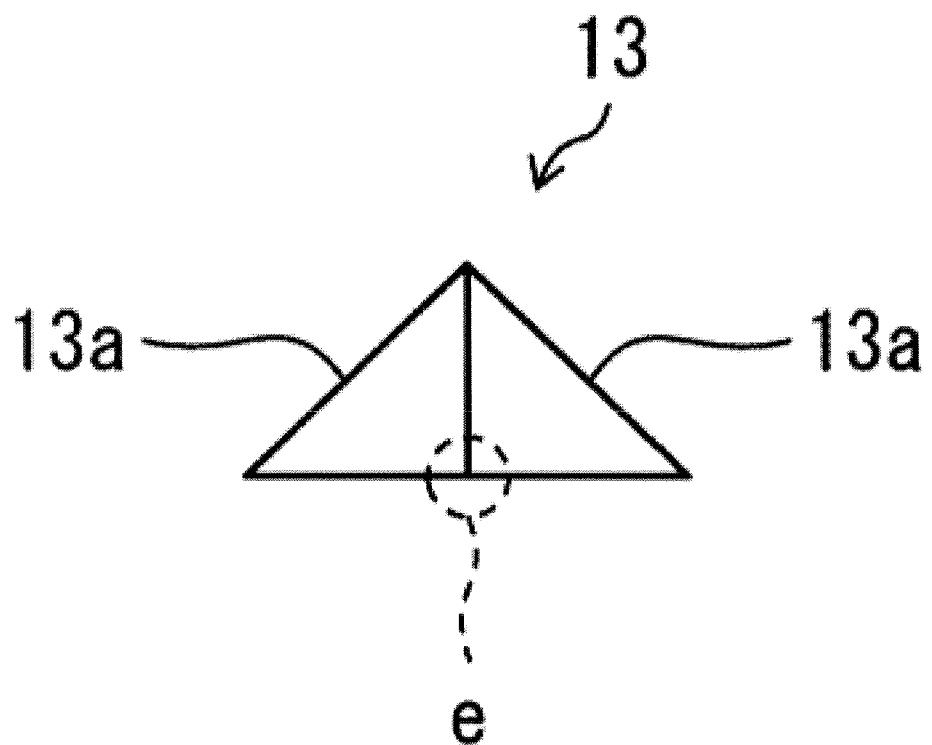
FIG. 7D is a side view thereof.
Figure 8A:
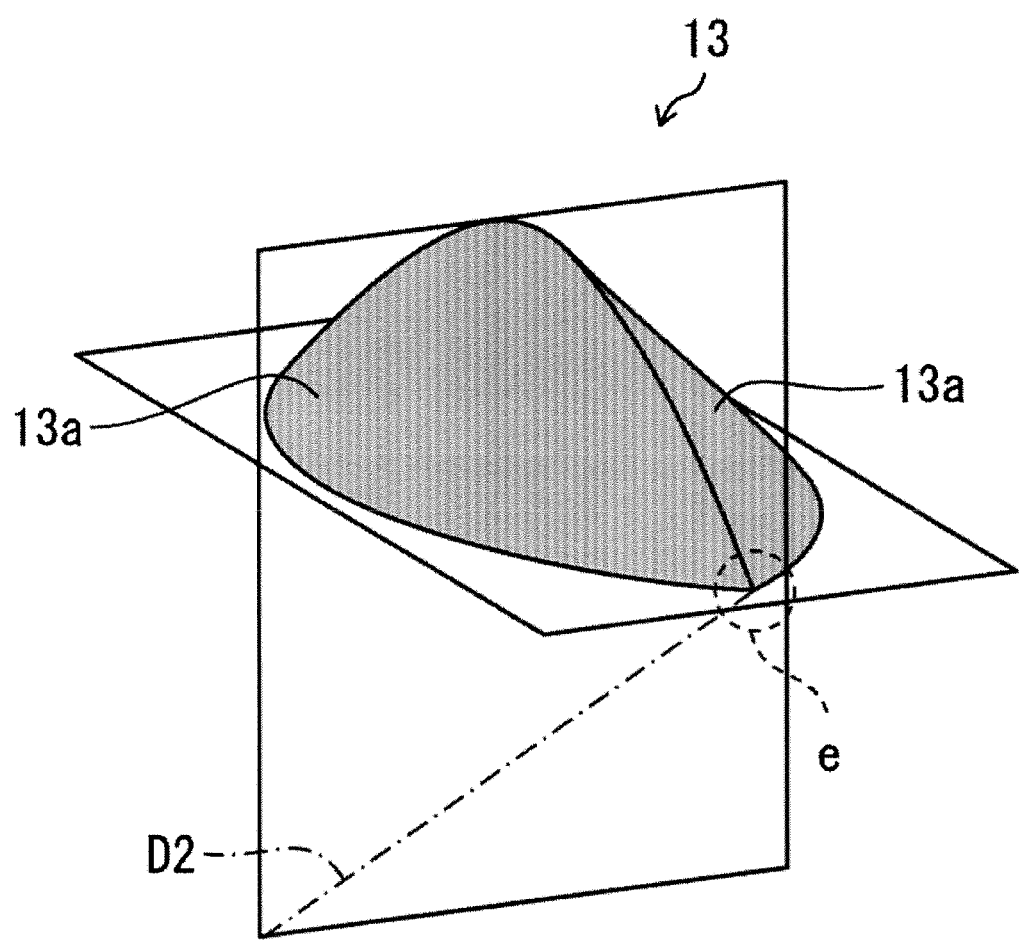
FIG. 8A is a perspective view for describing the particulars of the shape of this cluster of second reflective structures.
Figure 8B:
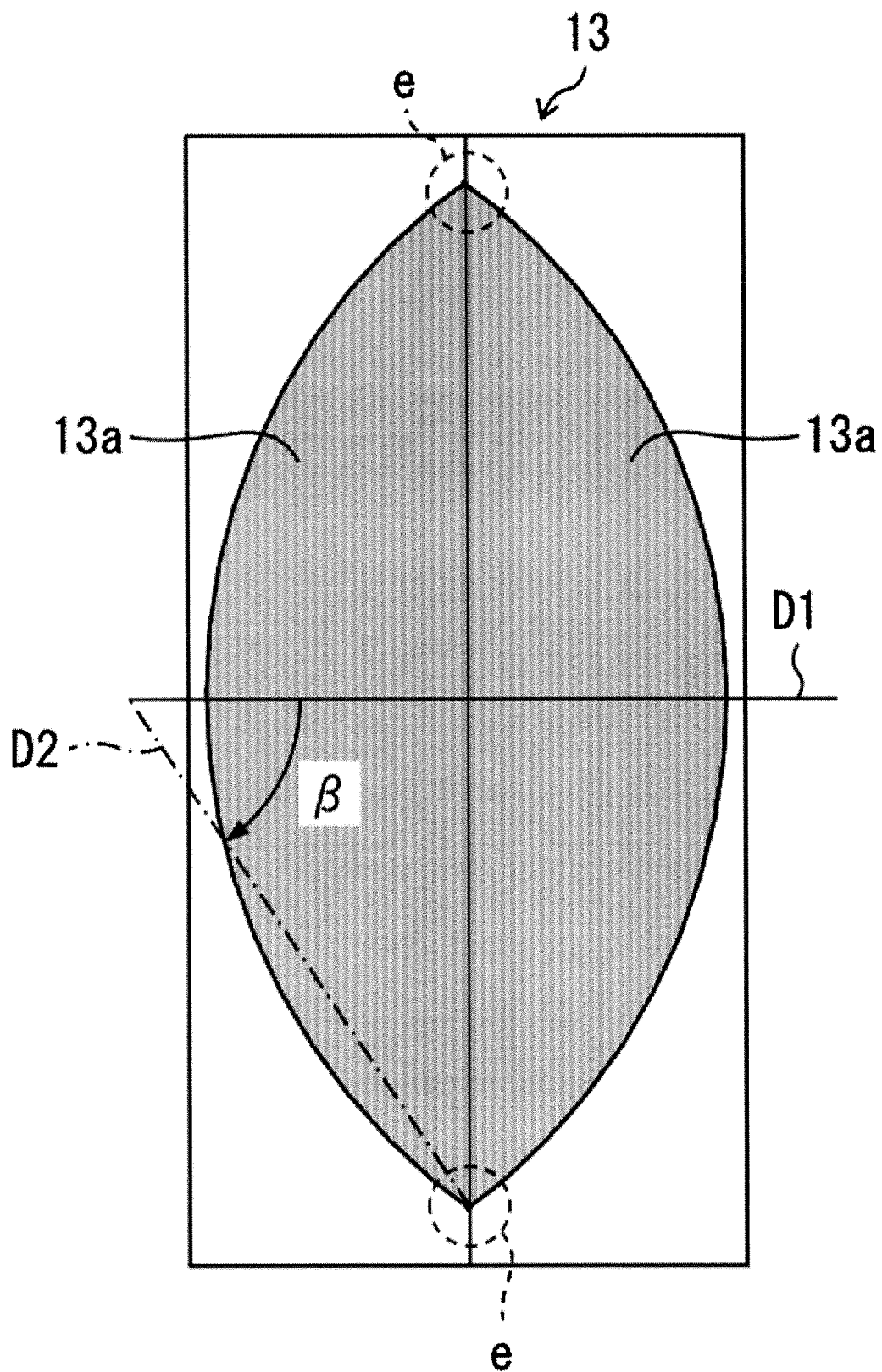
FIG. 8B is a plan view and FIG. 8C is a side view of the same.
Figure 8C:
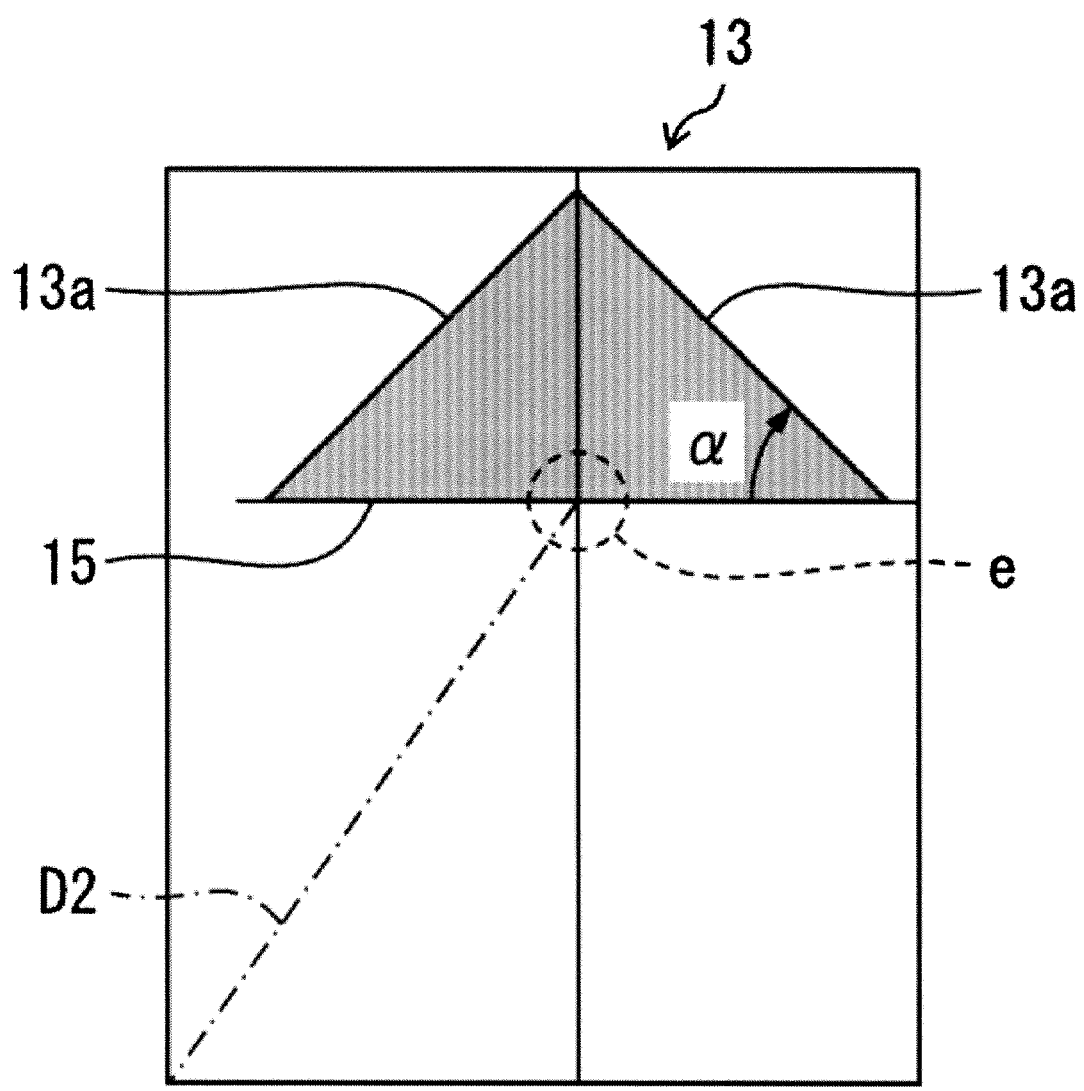
Figure 9A:
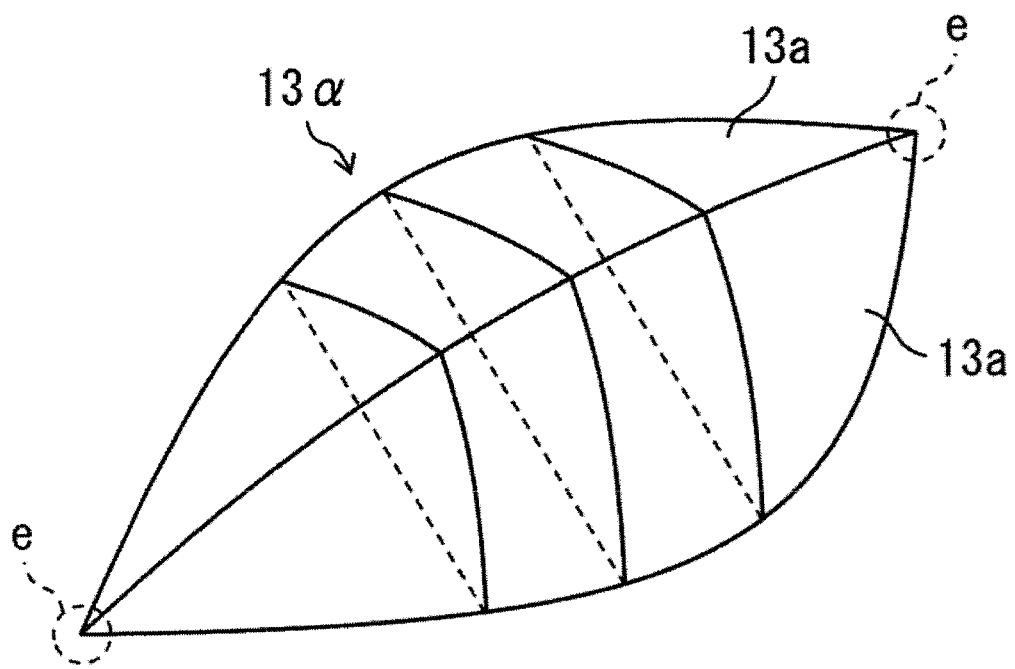
FIG. 9A through FIG. 9E are perspective views illustrating examples of modifying the shape of the cluster of second reflective structures.
Figure 9B:
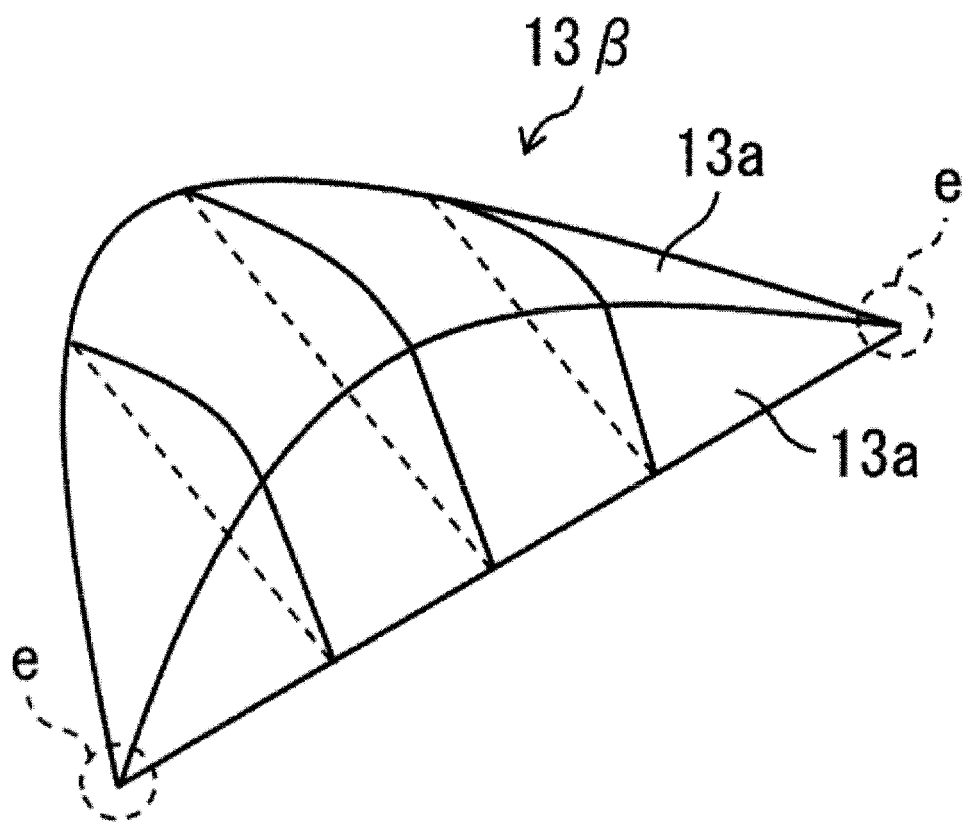
Figure 9C:
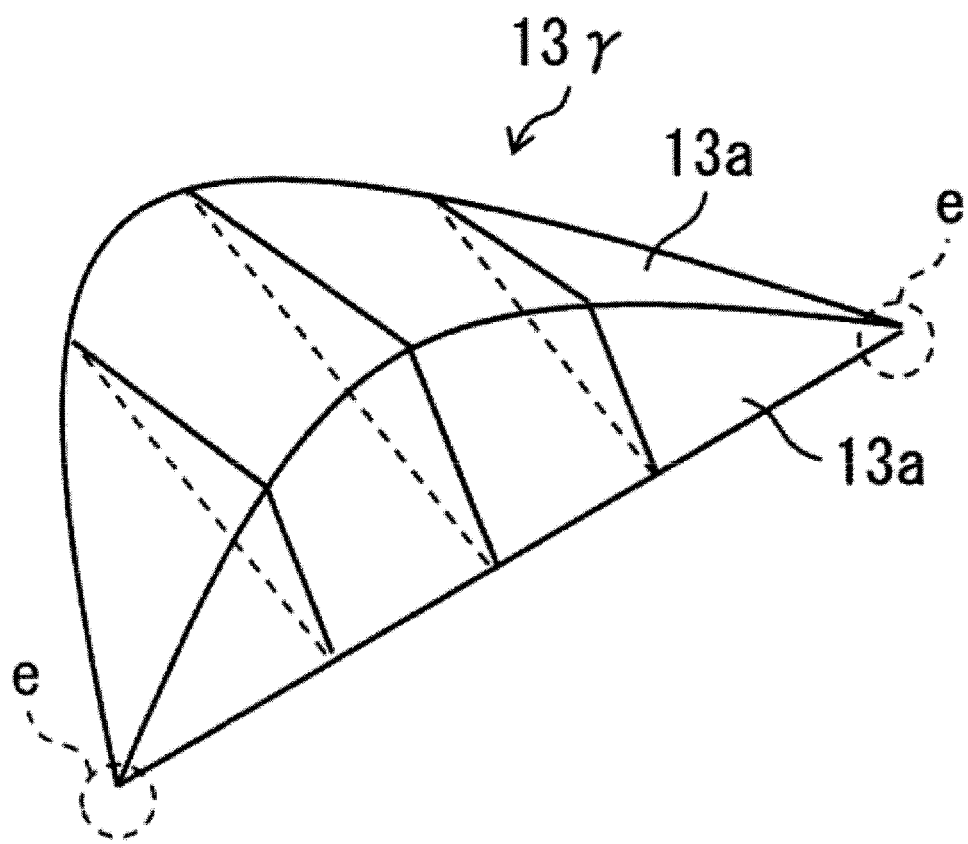
Figure 9D:
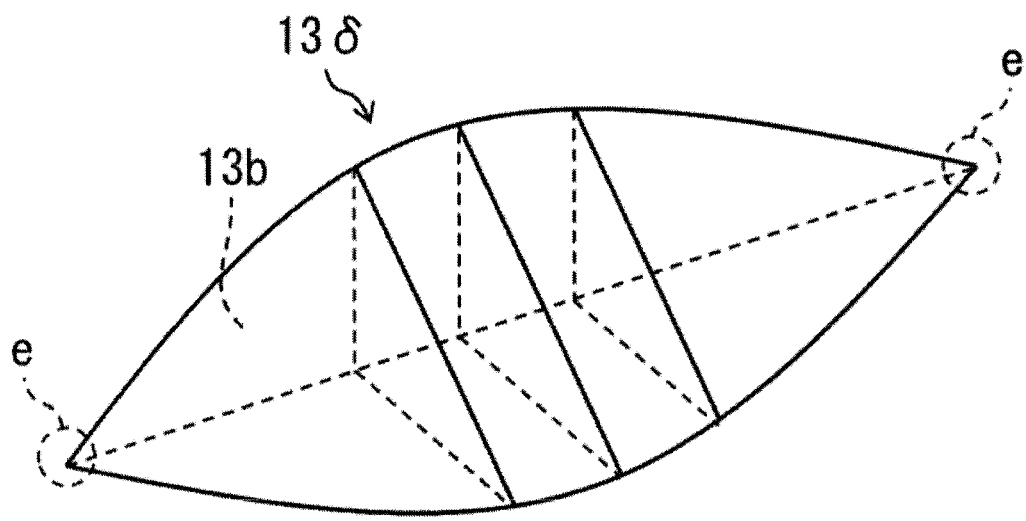
Figure 9E:
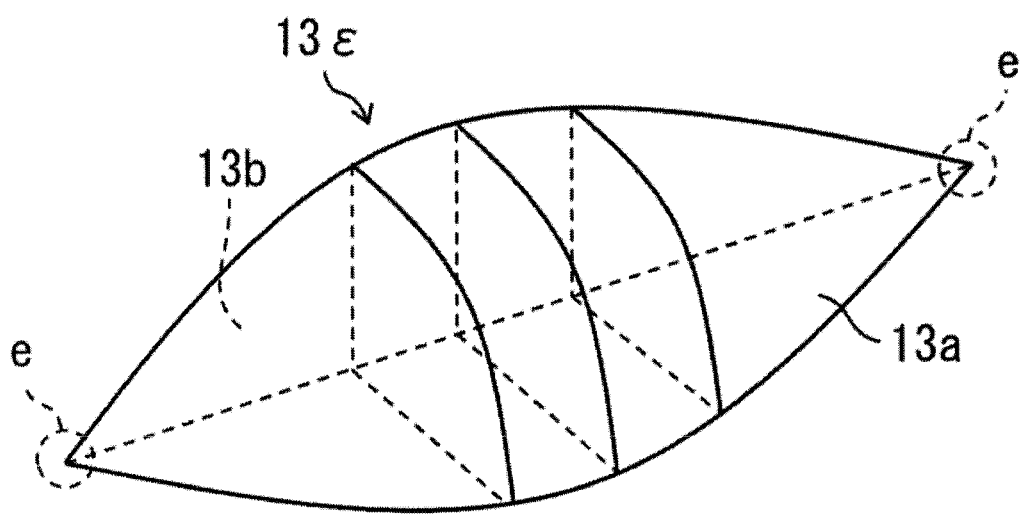

The recessed spindle-shaped pattern-display reflection patterns 13 of the first embodiment is described based on FIGS. 7A, 7B, 7C, 7D; FIGS. 8A, 8B, 8C; and FIG. 9. FIG. 7A is a perspective view illustrating the shapes of the clusters of pattern-display reflection patterns 13 formed on the light guide plate 10A; FIG. 7B is a plan view thereof; FIG. 7C is a front view thereof; and FIG. 7D is a side view thereof. FIG. 8A is a perspective view for describing the particulars of the shape of the pattern-display reflection patterns 13; FIG. 8B is a plan view; and FIG. 8C is a side view the same.

The light guide plate 10A may be made from, for instance, an acrylic plate in the first embodiment; when manufacturing a light guide plate 10A that includes the pattern-display reflection patterns 13 the light guide plate 10A may be injection molded from a die. In this case, if the pattern-display reflection patterns 13 are formed from rectangular recesses, there may be cases where the resin does not sufficiently fill the square recesses, losing shape and creating a small sag. This increases the likelihood that the edges of the prescribed display EM are unclear when the pattern-display reflection patterns 13 effects a prescribed display.

Therefore, the shapes of the recesses in the first embodiment appear spindle shaped when viewed in a direction perpendicular to the emission surface 14 as illustrated in FIGS. 7A, 7B, and 7C. Note that here, "spindle shaped" means shaped like a fish where the front and rear tips are narrow with a wider middle, that is, a streamlined shape.

As a result, no small sag occurs in the recesses when the resin flows into the die. Therefore, the prescribed display EM presented has clear edges.

Here, the spindle-shaped pattern-display reflection patterns 13 is described in further detail.

As illustrated in FIGS. 7A, 7B, 7C, and 7D, in the first embodiment the pattern-display reflection patterns 13 in effect includes two inclined reflection surfaces 13a, with one of the reflection surfaces 13d reflecting light entering the light guide plate 10A toward the emission surface 14 of the light guide plate 10A. This pattern-display reflection pattern 13 appears spindle shaped when viewed from a direction perpendicular to the emission surface 14 of the light guide plate 10A with both ends including a pointed edge e. The pattern-display reflection pattern 13 is also perpendicular to the back surface 15 of the light guide plate 10A with a planar cross-section along the direction reflected light travels forming an isosceles triangle (a reverse 'V'). The height and the length of the pattern-display reflection pattern 13 gradually decreases with distance from the center of the pattern to the pointed edge e with the height and the depth equaling zero at the pointed edge e. Note that the height of the pattern-display reflection pattern 13 is the length in the thickness direction of the light guide plate 10A, while the length is parallel to the direction reflected light travels.

This kind of streamlined pattern-display reflection patterns 13 tends to make sure molding small sag problems less likely.

The pattern-display reflection patterns 13 are also capable of providing a stable reflection effect with the spindle shape. More specifically, as illustrated in FIGS. 8A and 8B, given a dividing line D1 orthogonal to a line segment connecting both pointed ends e of a pattern-display reflection pattern 13, and a line D2 connecting one point on the dividing line D1 and a given pointed end e, optimizing an angle β formed between the dividing line D1 and the line D2 minimizes the light emitted by the reflection surface 13a of the light radiating from the given pointed end e.

Further, as illustrated in FIG. 8C, optimizing the angle of the reflection surface 13a relative to the back surface 15 of the light guide plate 10A (i.e., the inclination α) also makes it possible to produce an image of the prescribed display EM at a predetermined location.

Note that the shapes of the pattern-display reflection patterns 13 may vary. FIG. 9A through FIG. 9E are perspective views illustrating examples of modifying the shape of the pattern-display reflection patterns 13.

That is, where the pattern-display reflection patterns 13 illustrated FIG. 7A have linear slanted surfaces as the reflection surfaces 13a, 13a, a pattern-display reflection pattern 13 α illustrated in FIG. 9 may include two reflection surfaces 13a, 13a whose slanted surfaces are curved. Further, as illustrated by the pattern-display reflection patterns 13 β in FIG. 9B and the pattern-display reflection patterns 13 γ in FIG. 9C, the one of the two reflection surfaces 13a, 13a may have a slanted surface with a different inclination α. Moreover, as illustrated by the pattern-display reflection patterns 13 δ in FIG. 9D and the pattern-display reflection patterns 13 ε in FIG. 9E may include one of the reflection surface 13a arranged in the direction of the pattern display LED 5A with the surface opposite said reflection surface 13a falling sharply orthogonal to the back surface 15 of the light guide plate 10A.

Figure 10A:
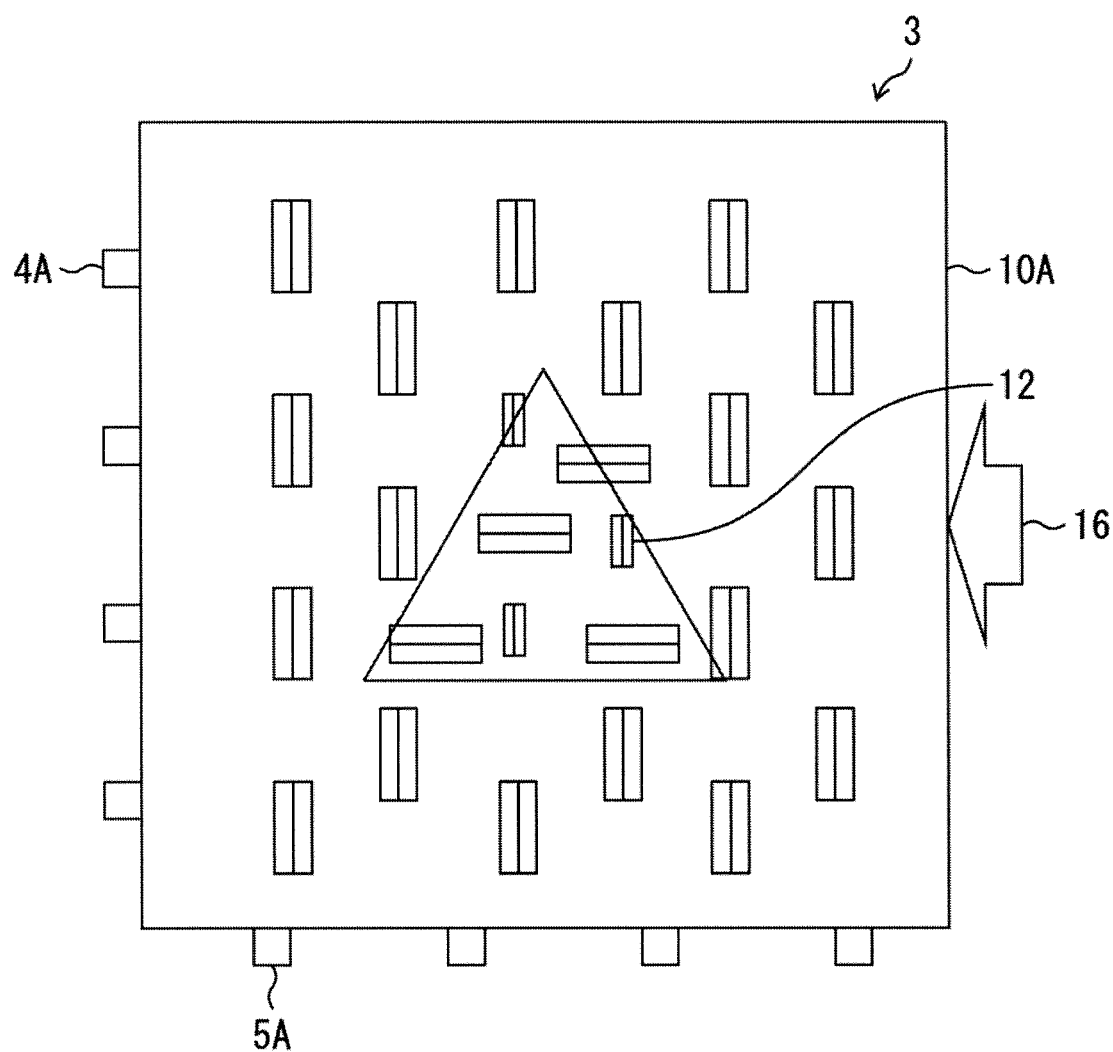
FIG. 10A is a plan view illustrating the relationship between the direction resin is injected when producing the light guide plate and the orientation of the clusters of first reflective structures and second reflective structures.
Figure 10B:
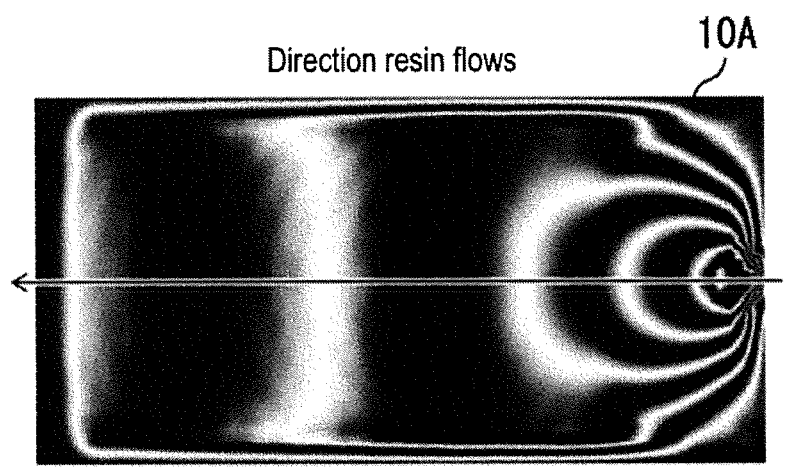
FIG. 10B is a plan view illustrating the direction of birefringence when the resin is injected from a gate when producing the light guide plate.

Here, the relationship between the direction the pattern-display reflection patterns 13 in the first embodiment and the flow direction of the resident when producing the light guide plate 10A is described based on FIGS. 10A and 10B. FIG. 10A is a plan view illustrating the relationship between the direction resin is injected when producing the light guide plate 10A and the orientation of the liquid-crystal reflection patterns 12 and the pattern-display reflection patterns 13. FIG. 10B is a plan view illustrating the direction of birefringence when the resin is injected from a gate 16 when producing the light guide plate 10A.

As previously described the light guide plate 10A in the backlight 3 is made from an acrylic resin, and as illustrated in FIG. 10A, the light guide plate 10A is produced by pouring and injection molding the resin from a gate 16 lying opposite the liquid crystal display LED 4A of the light guide plate 10A. In this case, after the resin hardens the birefringence of the light guide plate changes such that the birefringence coincides with the flow direction of the resin as illustrated in FIG. 10B. Birefringence here refers to the state where a light ray splits with the resulting rays following different paths when a light ray passes through a certain kind of substance. For instance, a letter that appears doubly when viewed through calcite. This double appearance is referred to as birefringence.

In FIG. 10B, the resin is poured from the right of the light guide plate 10A and the change in birefringence presents as stripes. It can be understood that at the right end of the light guide plate 10A the birefringence changes in concentric circles about the gate 16, whereas at the left side of the light guide plate 10A the birefringence changes from left to right at the center of the light guide plate 10A in accordance with the resin flowing linearly along the left side of the light guide plate 10A.

In the first embodiment, the pattern-display reflection patterns 13 are formed on the light guide plate 10A so that the ridge (i.e. the reflection surfaces 13a) of the pattern-display reflection patterns 13 are parallel to the direction the birefringence changes. Thus, the reflection surfaces 13a of the pattern-display reflection patterns 13 are parallel to the flow of resin when producing a light guide plate 10A via injection molding. This increases the mobility of the resin and therefore prevents small sag on the reflection surfaces 13a on the pattern-display reflection patterns 13 thus making it possible to effect a prescribed display EM with clear edges.

Incidentally, the liquid crystal display LED 4A and the pattern display LED 5A are connected to a controller 6 in the liquid crystal display device 1A of the first embodiment as illustrated in FIG. 3A and FIG. 3B. The controller 6 controls the activation of the liquid crystal display LED 4A and the pattern display LED 5A.

Figure 11A:
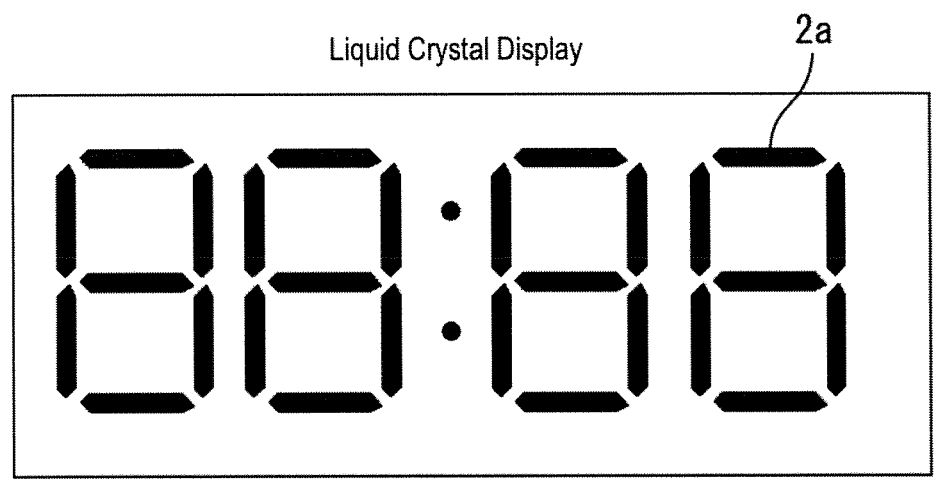
FIG. 11A is a plan view illustrating presentation on the display panel via the cluster of first reflective structures formed on the light guide plate.
Figure 11B:
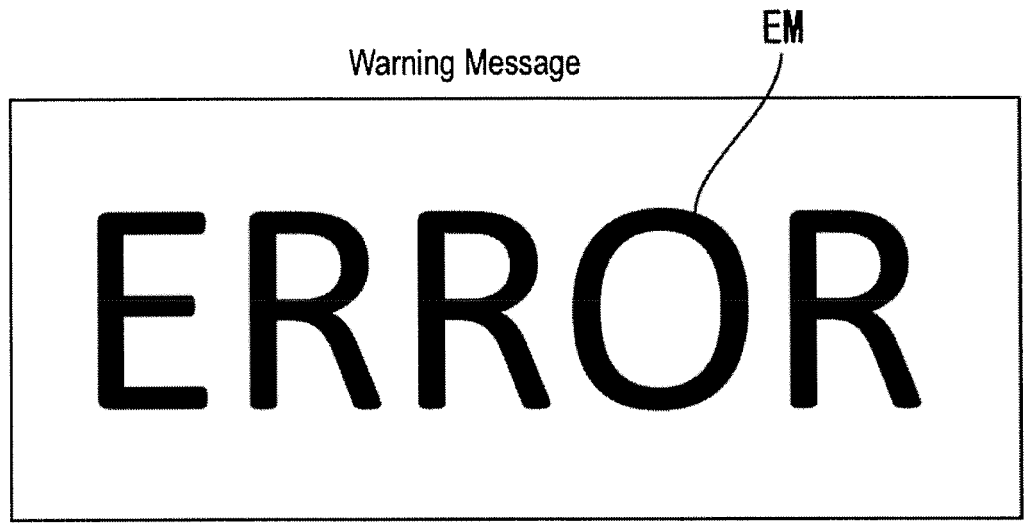
FIG. 11B is a plan view illustrating a prescribed presentation via the cluster of second reflective structures formed on the light guide plate.

Consequently, the controller 6 makes it possible to switch between and activate the liquid crystal display LED 4A and the pattern display LED 5A. Therefore, on the one hand, the liquid-crystal display 2a is presented when the liquid crystal display LED 4A is activated as illustrated in FIG. 11A, and the prescribed display EM is presented when the pattern display LED 5A is activated as illustrated in FIG. 11B.

The controller 6 may also control the liquid crystal display LED 4A and the pattern display LED 5A so that the light sources are lit simultaneously. Thus, the liquid-crystal display 2a illustrated in FIG. 11A, and the prescribed display EM illustrated in FIG. 11B may be presented simultaneously.

Note that the present invention are not particularly limited to the above-mentioned embodiments, and the above embodiments may be modified in various ways and remain within the technical scope of the present invention. For example, while in the above-mentioned embodiments, the prescribed display EM is presented on the emission surface 14 of the light guide plate 10A, the present invention is not particularly limited thereto.

For example, the prescribed display EM produced via the pattern-display reflection patterns 13 of the light guide plate 10A may be presented in the space in front of the display panel 2. That is, two pattern-display reflection patterns 13 may form an actual image of a point in a space in front of the display panel 2 is an image formed by the pattern-display reflection patterns 13. Consequently, providing a plurality of pattern-display reflection patterns 13 makes it possible to form an actual image of a line in a space in front of the display panel 2, and furthermore makes it possible to form an actual image of a plane in a space in front of the display panel 2. It is thus possible to foul a stereoscopic image of the prescribed display EM in a space in front of the display panel 2.

In this way, as an example the light guide plate 10A may include liquid-crystal reflection patterns 12 and pattern-display reflection patterns 13 formed thereon in a liquid crystal display device 1A according to one or more embodiments. The liquid-crystal reflection patterns 12 change the optical path of light entering the light guide plate 10A via a first side edge 11a from the liquid crystal display LED 4A via reflection and cause the light exit toward the display panel 2 from the emission surface 14. The pattern-display reflection patterns 13 change the optical path of light entering the light guide plate 10A via a second side edge 11b from the pattern display LED 5A via reflection and cause the light to exit from an emission surface 14 to effect a prescribed display EM.

Hereby, controlling activation of the liquid crystal display LED 4A and the pattern display LED 5A makes it possible for the display panel 2 to effect only liquid-crystal display 2a using the liquid-crystal reflection patterns 12 on the light guide plate 10A, effect only the prescribed display EM using the pattern-display reflection patterns 13 on the light guide plate 10A, or effect both the liquid-crystal display 2a and the prescribed display EM.

Accordingly, the liquid crystal display device 1A is capable of effecting liquid-crystal display 2a on the display panel 2 and separately via a process other than liquid-crystal display 2a independently of when liquid crystals are used to effect display.

The liquid-crystal reflection patterns 12 and the pattern-display reflection patterns 13 may be mixed together in a predetermined area on the liquid light guide plate 10A of the liquid crystal display device 1A; one or more embodiments ensures that the liquid-crystal reflection patterns 12 inside the predetermined area are smaller than the liquid-crystal reflection patterns 12 outside the predetermined area in these cases. The brightness of light from the light guide plate 10A may thus be made uniform.

As another example, pattern-display reflection patterns 13 may be a plurality of recesses drilled into the back surface 15 of the light guide plate 10A in the liquid crystal display device 1A of one or more embodiments. The recesses may appear spindle shaped when viewed from a direction perpendicular to the emission surface 14. As a result, no small sag occurs in the recesses when the resin flows into the die, and the prescribed display EM presented has clear edges.

As another example, the reflection surfaces 13a of the pattern-display reflection patterns 13 are parallel to the direction of change of birefringence in the light guide plate 10A in the liquid crystal display device 1A of one or more embodiments. This increases the mobility of the resin and therefore prevents small sag on the reflection surfaces 13a on the pattern-display reflection patterns 13 thus making it possible to effect a prescribed display EM with clear edges.

As another example, the pattern-display reflection patterns 13 on the light guide plate 10A effect the prescribed the display EM on the emission surface 14 of the light guide plate 10A in the liquid crystal display device 1A according to one or more embodiments. Therefore, the prescribed display EM can be seen externally through the display panel 2. Thus, it is possible to visually confirm the prescribed display EM presented on the emission surface 14 of the light guide plate 10A via the display panel 2 when viewing the display panel 2.

As another example, the prescribed display EM produced via the pattern-display reflection patterns 13 of the light guide plate 10A may be presented in the space in front of the display panel 2 in the liquid crystal display device 1A according to one or more embodiments. It is thus possible to form a stereoscopic image of the prescribed display EM in front of the surface of the display panel 2.

As another example, a controller 6 may be provided in the liquid crystal display device 1A to control activation of the liquid crystal display LED 4A and the pattern display LED 5A according to one or more embodiments. Hereby, it is possible to effect only liquid-crystal display 2a using the liquid-crystal reflection patterns 12 on the light guide plate 10A, effect only the prescribed display EM using the pattern-display reflection patterns 13 on the light guide plate 10A, or effect both the liquid-crystal display 2a and the prescribed display EM.

As another example, the controller 6 in the liquid crystal display device 1A may switch between and activate the liquid crystal display LED 4A and the pattern display LED 5A according to one or more embodiments. Hereby, it is possible switch between effecting only liquid-crystal display 2a on the display panel 2 using the liquid-crystal reflection patterns 12 on the light guide plate 10A and effecting only the prescribed display EM using the pattern-display reflection patterns 13 on the light guide plate 10A.

As another example, the controller 6 may simultaneously activates the liquid crystal display LED 4A and the pattern display LED 5A to thereby simultaneously effect liquid-crystal display 2a using the liquid-crystal reflection patterns 12, and effect the prescribed display EM using the pattern-display reflection patterns 13 in the light in the liquid crystal display device 1A according to one or more embodiments. Hereby, the liquid-crystal display 2a on the display panel 2 and the prescribed display EM via the pattern-display reflection patterns 13 appear simultaneously due to activation of the liquid crystal display LED 4A and the pattern display LED 5A respectively.

The liquid crystal display device 1A of one or more embodiments is also configured with a display panel 2 driven in normally white mode. Therefore, a user can see the prescribed display EM even when the display panel 2 does not present the liquid-crystal display 2a.

Only one type of pattern-display reflection patterns 13 and prescribed display EM are provided via the light guide plate 10A in the liquid crystal display device 1A of one or more embodiments. However, the present invention is not limited thereto. As illustrated in FIG. 2A and FIG. 2B, pattern display LEDs 5A may be provided at the site pages of the light guide plate 10A with clusters of second reflective structures formed on the light guide plate 10A corresponding to the pattern display LEDs 5A. Thus, a plurality of mutually different prescribed displays EM may be presented, instead of only one type of prescribed display EM.

Here ends the description the liquid crystal display device 1A. However, the liquid crystal display device 1A is not the only possible configuration of the embodiments. The display device 1, described as an example of adopting concepts of one or more embodiments of the present invention may be used as a backlight 3 for a display panel 2 that effects presentation via liquid crystals that produce a monochrome image.

Second Embodiment

Figure 12:
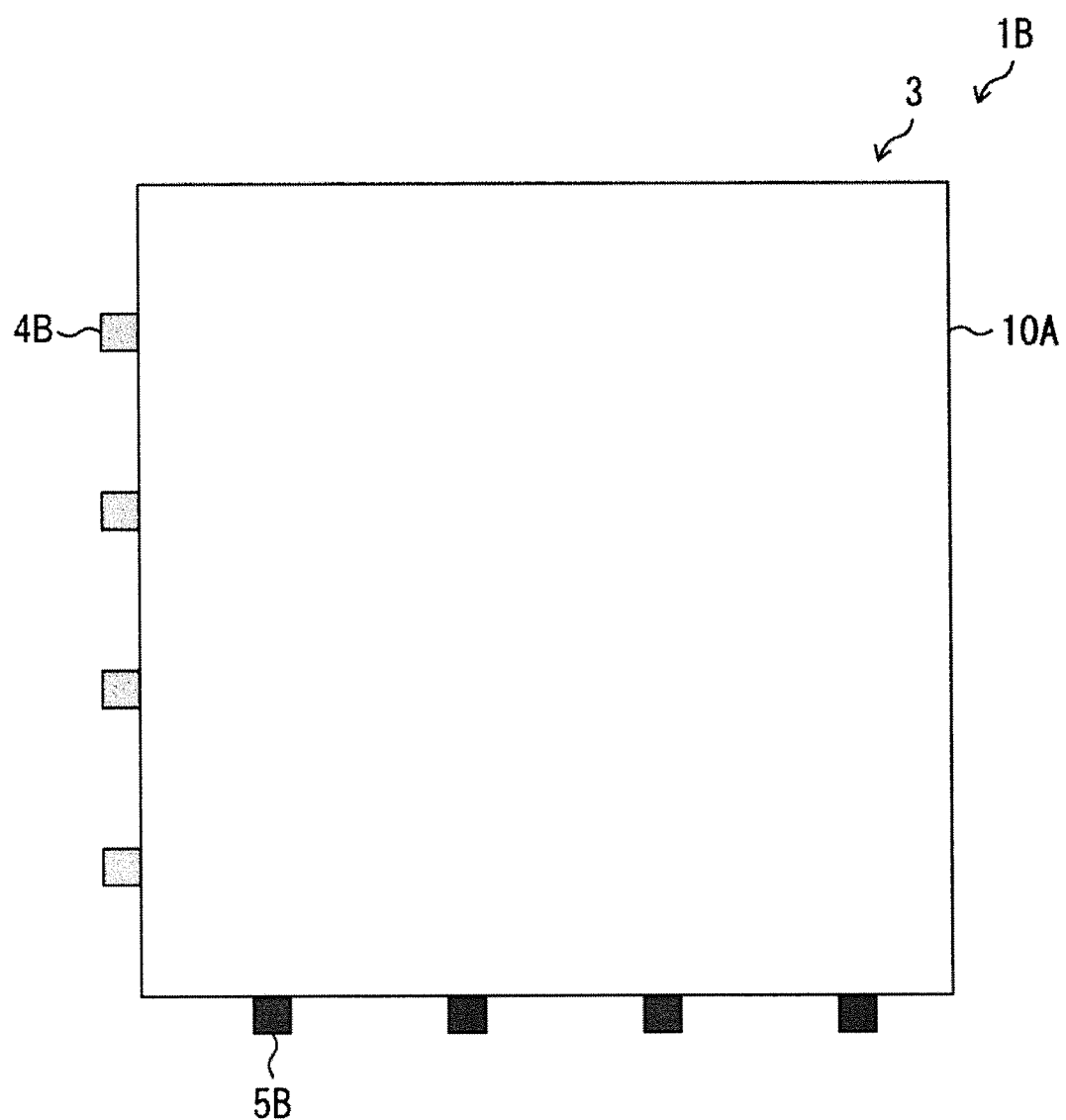
FIG. 12 depicts a liquid crystal display device according to a second embodiment of the present invention and more specifically is a plan view of a configuration thereof.

Another embodiment of the present invention is described below with reference to FIG. 12. Features omitted in describing the second embodiment have already been described with reference to the first embodiment. For the sake of convenience, components previously described in the first embodiment that have an identical function are given the same reference numerals, and an explanation thereof is omitted.

Note that the color of light emitted from the liquid crystal display LED 4A and the pattern display LED 5A is not particularly limited in the liquid crystal display device 1A of the first embodiment. In contrast, here the liquid crystal display device 1B according to the second embodiment includes a liquid crystal display LED 4B as a first light source and a pattern display LED 5B as a second light source. The liquid crystal display LED 4B and the pattern display LED 5B emit light of mutually different colors.

A liquid crystal display device 1B according to the second embodiment is described with reference to FIG. 12. FIG. 12 depicts the liquid crystal display device 1B according to a second embodiment of the present invention and more specifically is a plan view of a configuration thereof.

The liquid crystal display device 1B according to the second embodiment includes a liquid crystal display LED 4B and a pattern display LED 5B which emit light of mutually different colors. Hereby, the liquid-crystal display 2a presented on the display panel 2 by the liquid crystals that produce a monochrome image is a different color from the prescribed display EM. As a result, the prescribed display EM may be made more noticeable than the presentation on the display panel 2 via liquid crystals that produce a monochrome image when, for instance, the prescribed display EM is used to provide a warning message.

Third Embodiment

Another embodiment of the present invention is described below with reference to FIG. 13. Features omitted in describing the third embodiment have already been described with reference to the first and second embodiments. For the sake of convenience, components previously described in the first and second embodiments that have an identical function are given the same reference numerals, and an explanation thereof is omitted.

In addition to the features in the liquid crystal display device 1A of the first embodiment and the liquid crystal display device 1B of the second embodiment, the liquid crystal display device 1C according to the third embodiment includes a diffusion plate 7 and a reflection plate 8.

A liquid crystal display device 1C according to the third embodiment is described with reference to FIG. 12. FIG. 13 depicts a configuration of the liquid crystal display device 1C according to the third embodiment and more specifically is an exploded perspective view of a diffusion plate 7 and a reflection plate 8 therein.

Figure 13:
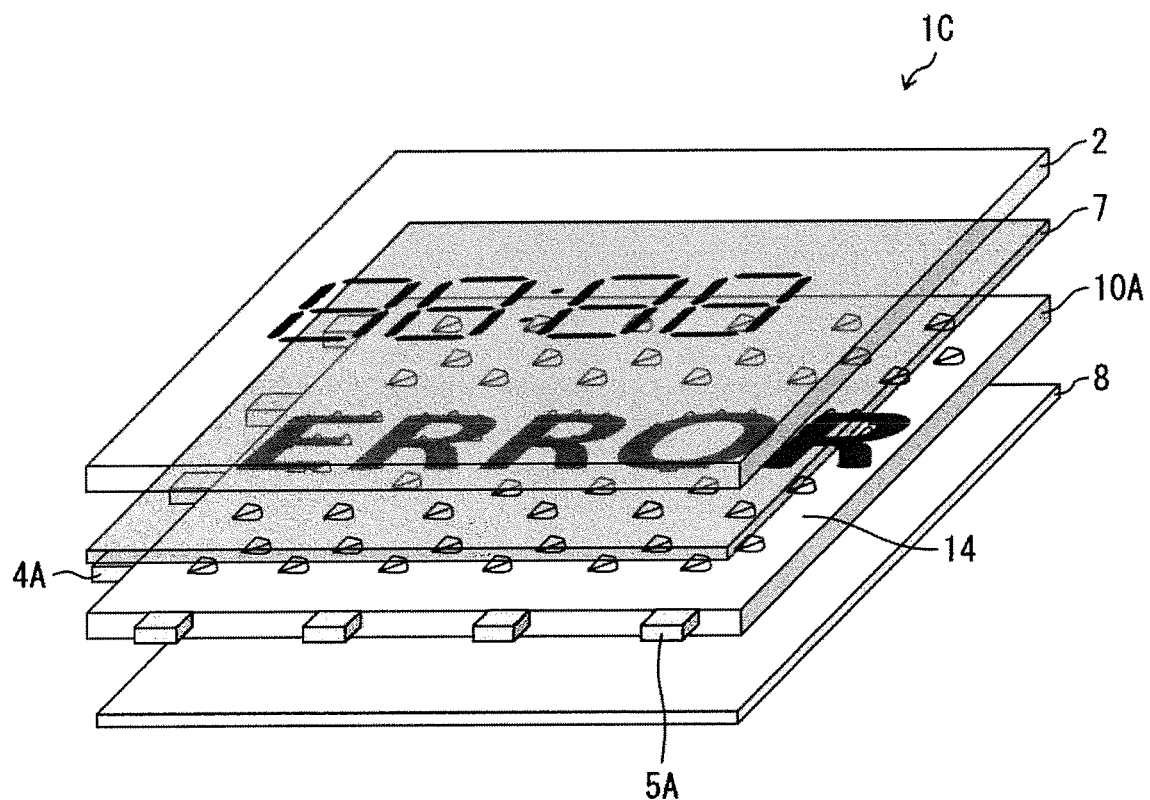
FIG. 13 depicts a configuration of a liquid crystal display device according to a third embodiment of the present invention and more specifically is an exploded perspective view of a diffusion plate and a reflection plate therein.

As illustrated in FIG. 13, in the third embodiment the liquid crystal display device 1C includes a diffusion plate 7 provided between the light guide plate 10A and the display panel 2 for diffusing light. The diffusion plate 7 may be produced from, for example a milky white resin plate. Hereby, the diffusion plate 7 increases the uniformity of brightness of light exiting from the emission surface 14 of the light guide plate 10A and entering the display panel 2 when the liquid crystal display LED 4A is activated to effect presentation on the display panel 2. Note that the prescribed display EM via the pattern-display reflection patterns 13 appears less clear when looking at the display panel 2 when the diffusion plate 7 is provided.

In the third embodiment the liquid crystal display device 1C is provided with a reflection plate 8 at the rear surface of the light guide plate 10A opposite the display panel 2. The reflection plate 8 returns light leaking from the rear surface of the light guide plate 10A to the light guide plate 10A. Hereby, the reflection plate 8 returns light leaking from the rear surface of the light guide plate 10A back to the light guide plate thus increasing the brightness of light entering the display panel 2 when the liquid crystal display LED 4A is activated to effect presentation on the display panel 2.

Fourth Embodiment

Another embodiment of the present invention is described below with reference to FIGS. 14A and 14B. Features omitted in describing the fourth embodiment have already been described with reference to the first through third embodiments. For the sake of convenience, components previously described in the first through third embodiments that have an identical function are given the same reference numerals, and an explanation thereof is omitted.

In addition to the features in the liquid crystal display devices 1A-1C of the first through third embodiments, the liquid crystal display device 1D according to the fourth embodiment includes a light guide plate 10D whereon is formed an optical coupler 17.

A liquid crystal display device 1D according to this embodiment is described with reference to FIGS. 14A and 14B. FIG. 14A is a plan view illustrating the direction light is guided when the light enters the backlight 3 from the pattern display LED 5B in a liquid crystal display devices 1A-1C according to the first through third embodiments. FIG. 14B illustrates a liquid crystal display device 1D according to a fourth embodiment of the present invention and more specifically is a plan view when light enters the backlight 3 from the pattern display LED 5B in the liquid crystal display device 1D.

Figure 14A:
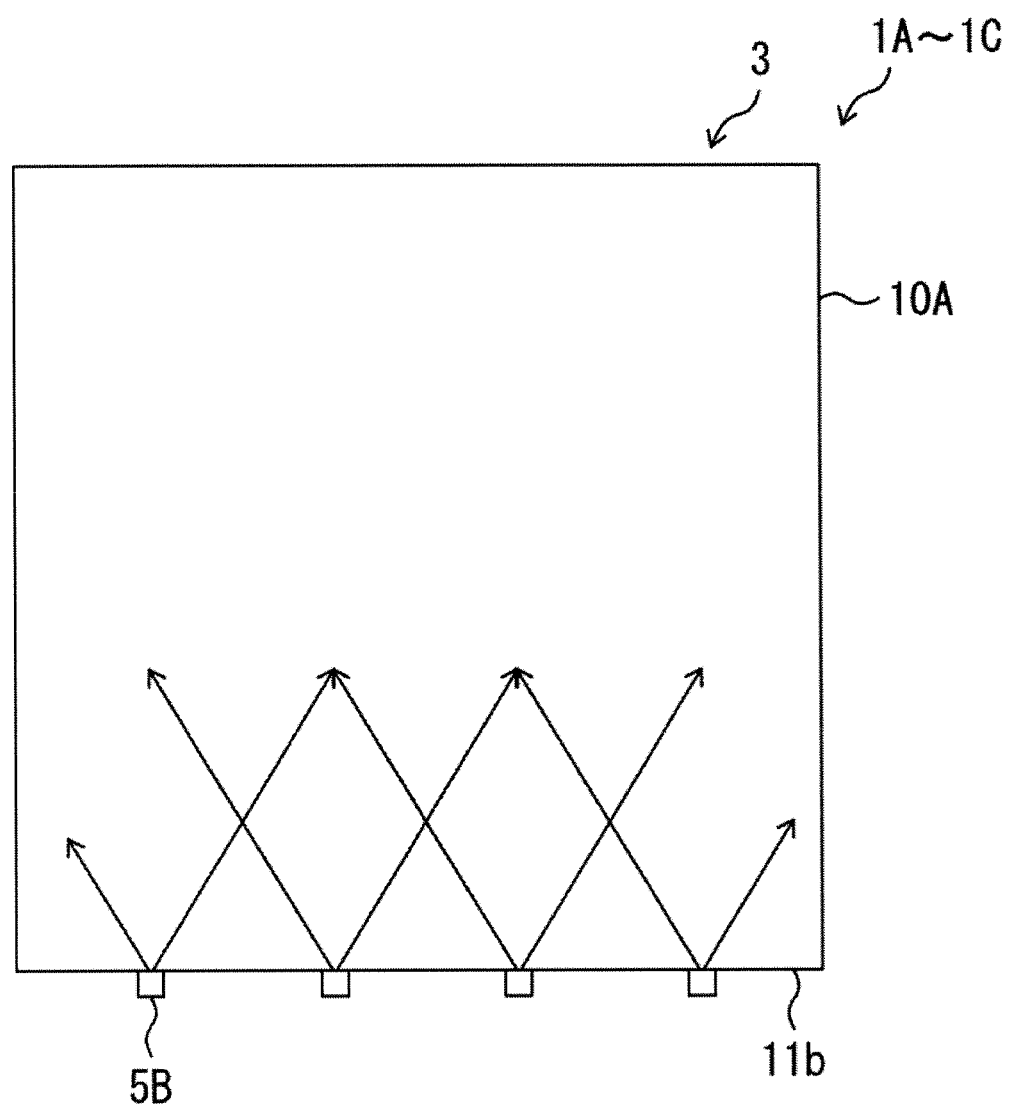
FIG. 14A is a plan view illustrating the direction light is guided when the light enters a backlight from a second light source in a liquid crystal display device according to the first through third embodiments.

As illustrated in FIG. 14A, the second side edge 11b of the light guide plate 10A is a smooth surface in the liquid crystal display device is 1A through 1C according to the aforementioned first through third embodiments. Hereby, light exits from the pattern-display LED 5B and enters the light guide plate 10A with a spread of, for instance, 60° about a centerline and is guided through the light guide plate 10A.

Figure 14B:
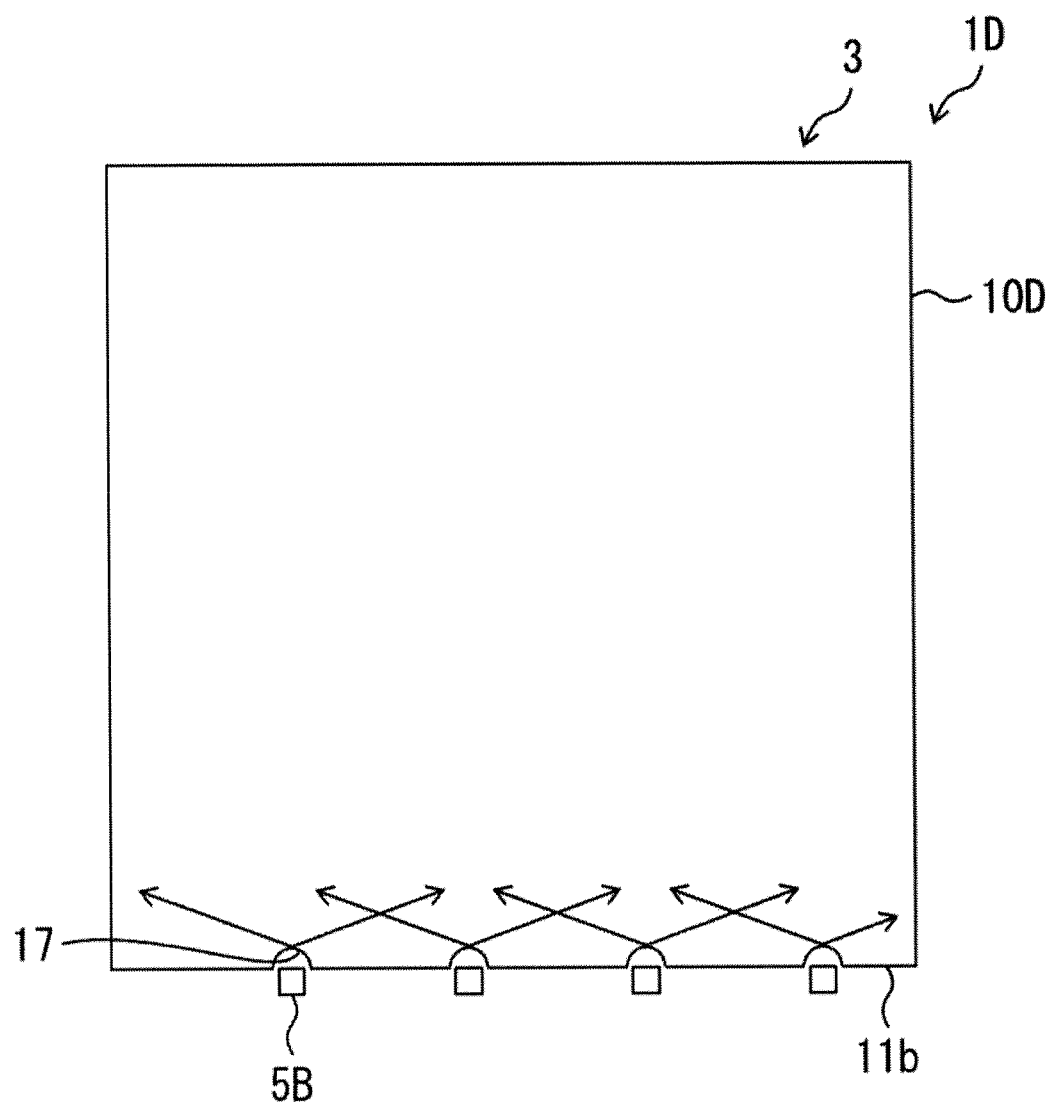
FIG. 14B illustrates a liquid crystal display device according to a fourth embodiment of the present invention and more specifically is a plan view when light enters the backlight from a second light source in the liquid crystal display device.

In contrast, as illustrated in FIG. 14B, the second side edge 11b of the backlight 3 includes optical couplers 17 fainted at the locations where light exiting from the pattern display LED 5B enters the light guide plate 10D in the liquid crystal display device 1D of the fourth embodiment. The optical coupler 17 may be a circular recess formed in the second side edge 11b at a location facing a pattern display LED 5B.

Hereby, light exits from the pattern-display LED 5B and enters the light guide plate 10D with a spread of, for instance, 120° about a centerline and is guided through the light guide plate 10D.

As a result, the brightness of the prescribed display EM is uniform because light arrives uniformly at the reflection surface 13a of the pattern-display reflection patterns 13. However, the brightness intensity of the prescribed display EM deteriorates.

Fifth Embodiment

Another embodiment of the present invention is described below with reference to FIG. 15 and FIG. 16. Features omitted in describing fifth embodiment have already been described with reference to the first through fourth embodiments. For the sake of convenience, components previously described in the first through third embodiments that have an identical function are given the same reference numerals, and an explanation thereof is omitted.

Figure 16A:
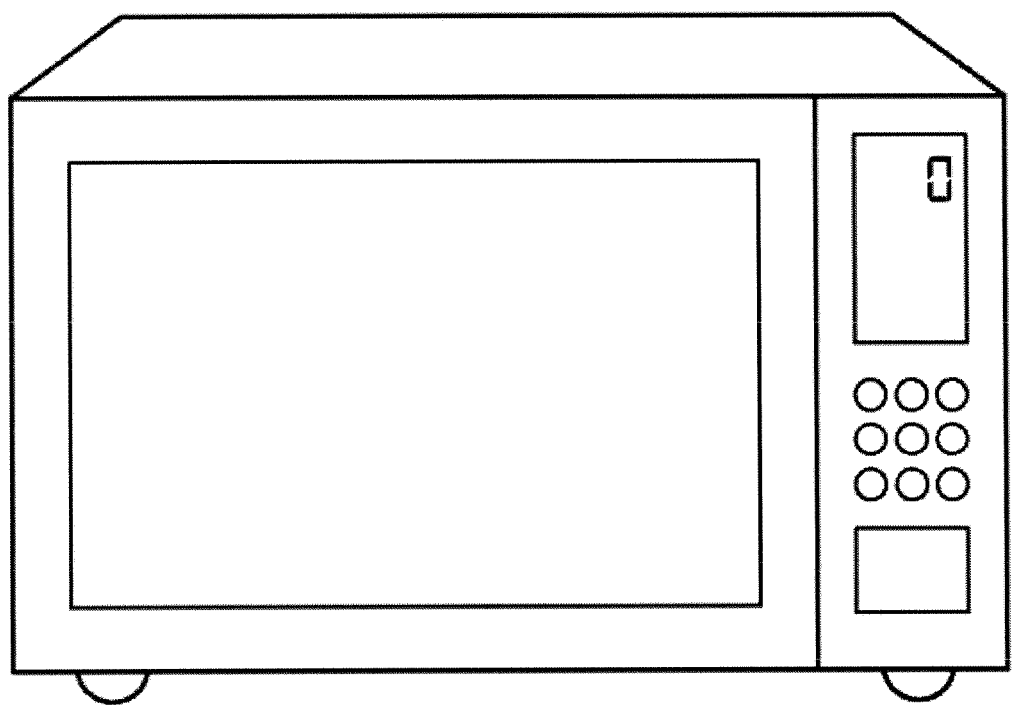
FIG. 16A illustrates the aforementioned liquid crystal display device and more specifically is a perspective view of the configuration of a microwave oven which is an example of adopting the liquid crystal display in an electrical home appliance.
Figure 16B:
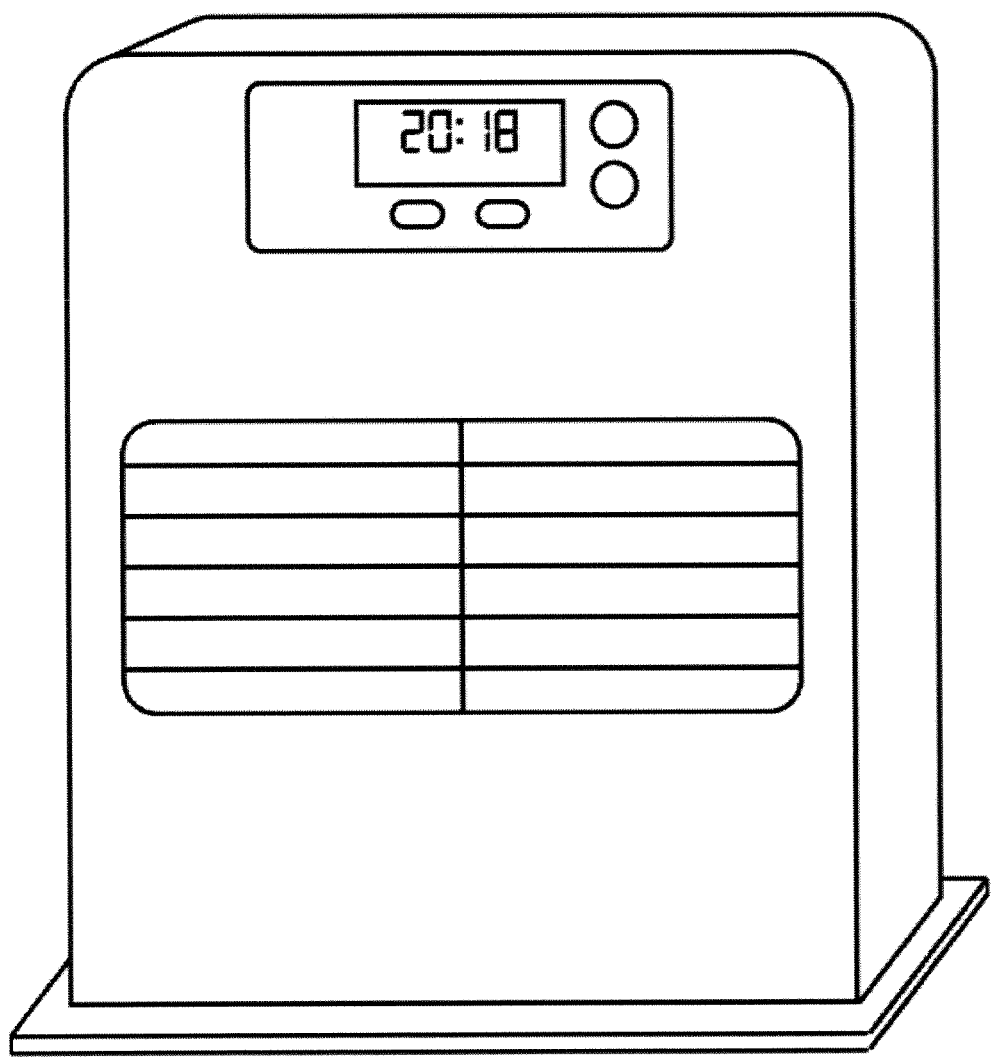
FIG. 16B is a perspective view of the configuration of a fan heater which is an example of adopting the liquid crystal display device in an electrical home appliance.
Figure 16C:
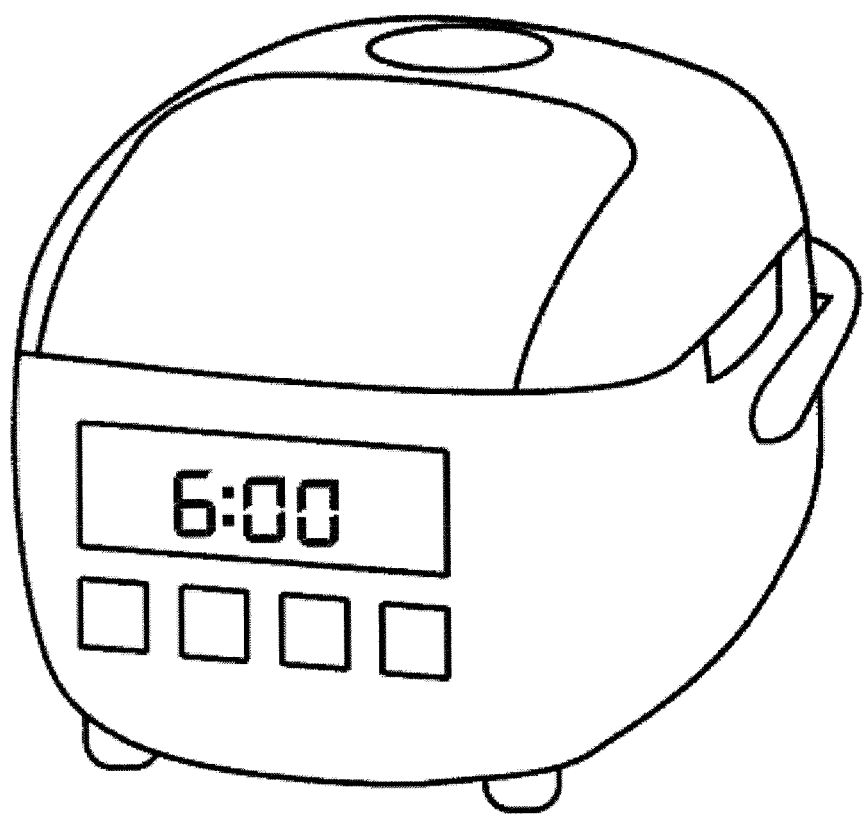
FIG. 16C is a perspective view of the configuration of a rice cooker which is one example of adopting the liquid crystal display in an electrical home appliance.
Figure 16D:
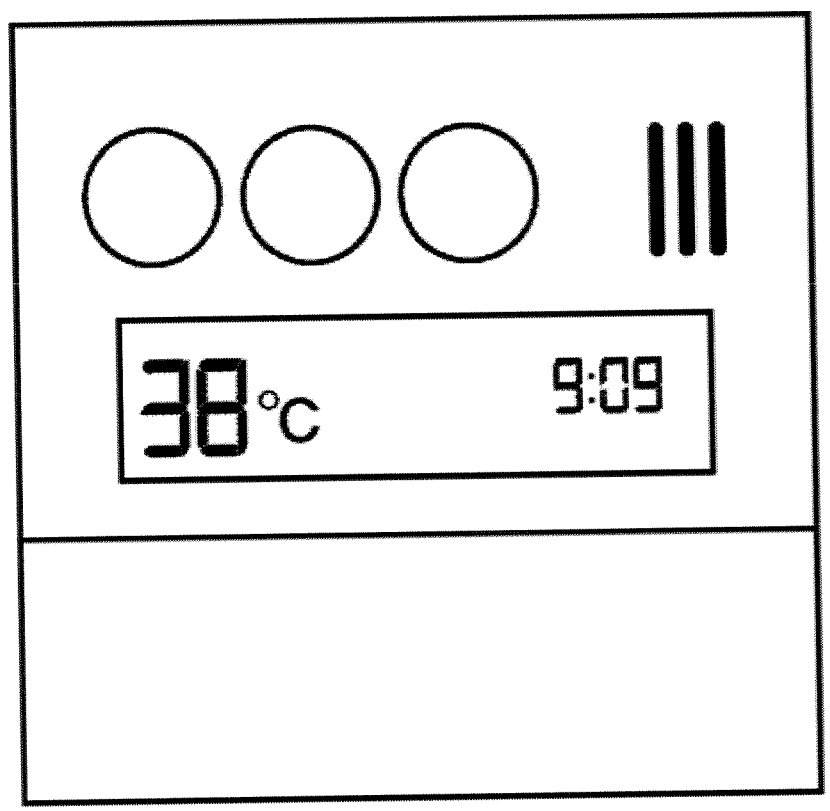
FIG. 16D is a front view illustrating a configuration of a water heater which is an example of adopting the liquid crystal display device in an electrical home appliance.
Figure 17A:
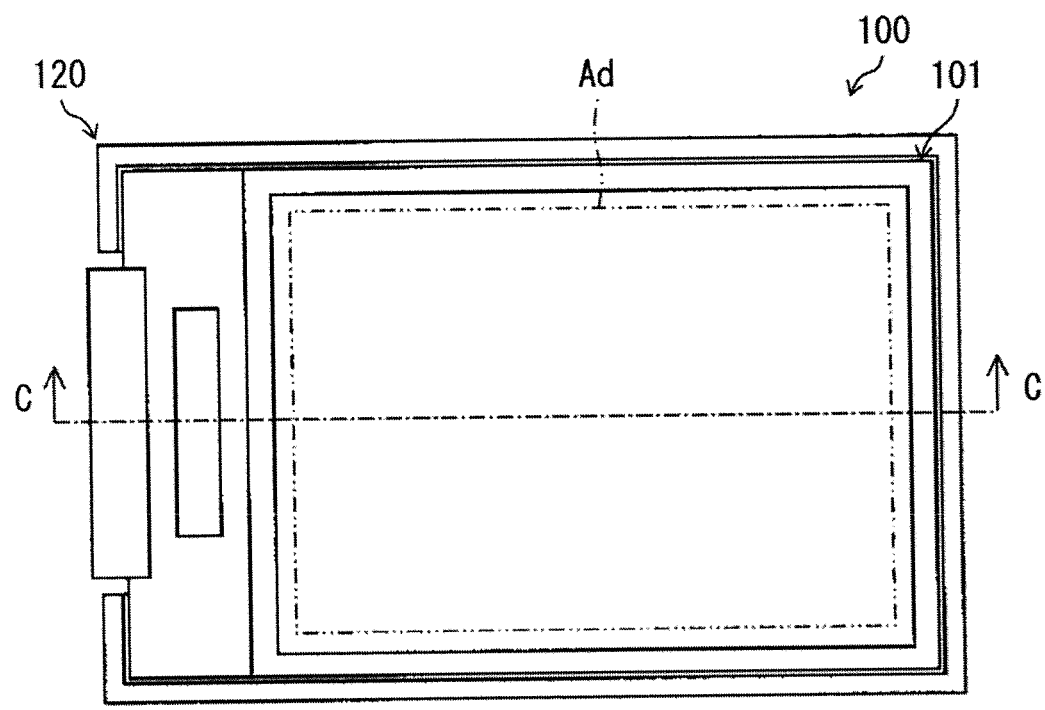
FIG. 17A is a plan view illustrating a configuration of a conventional liquid crystal display device.
Figure 17B:
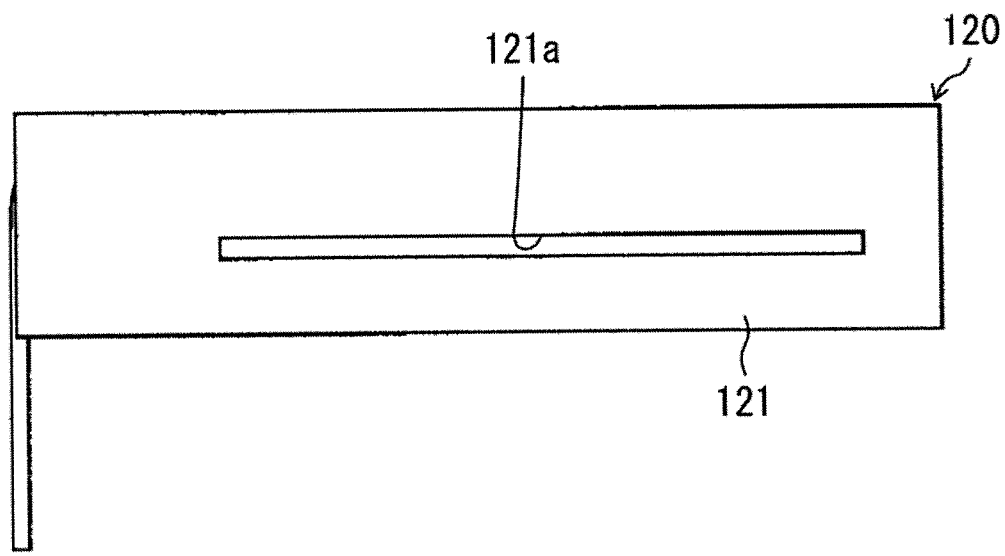
FIG. 17B is a side view illustrating a configuration of said liquid crystal display device.
Figure 17C:
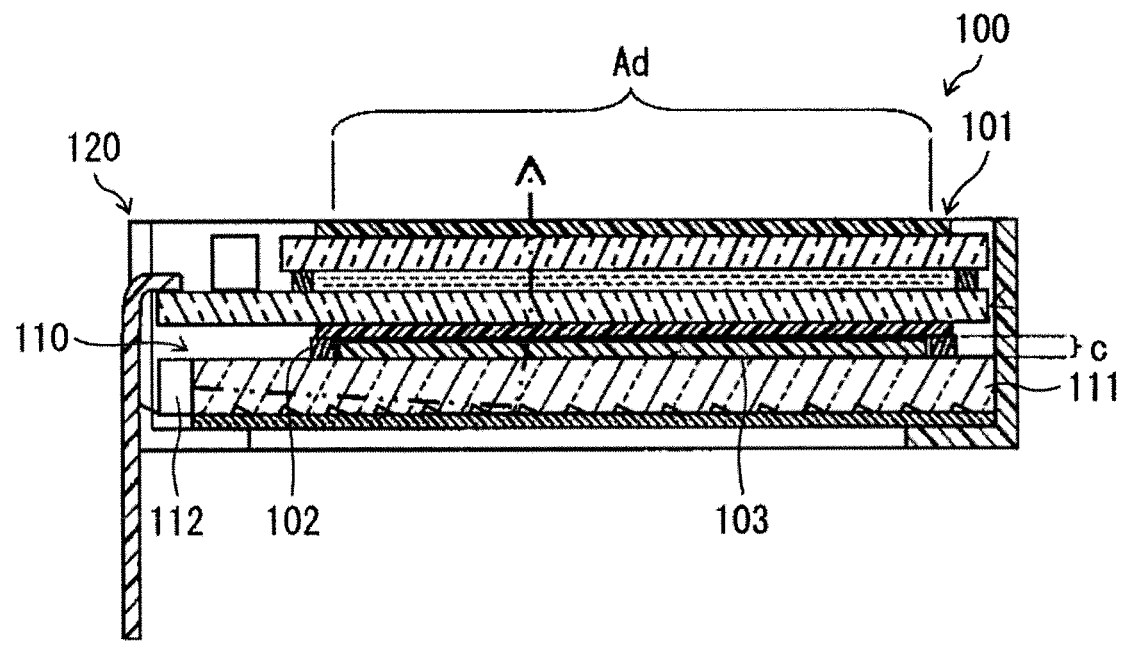
FIG. 17C is a cross-sectional view of a configuration of said liquid crystal display.
Figure 18A:
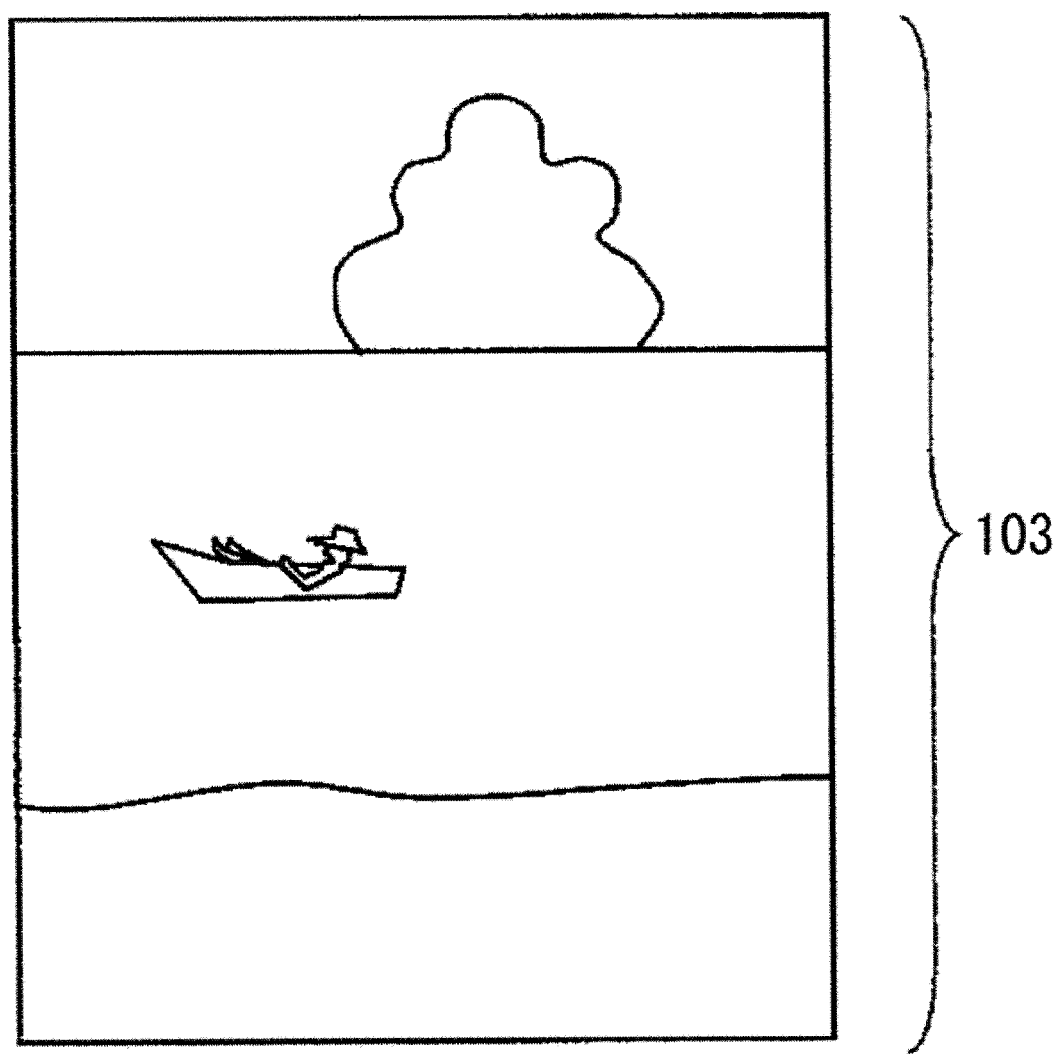
FIG. 18A is a plan view illustrating a background screen on said conventional liquid crystal display device.
Figure 18B:
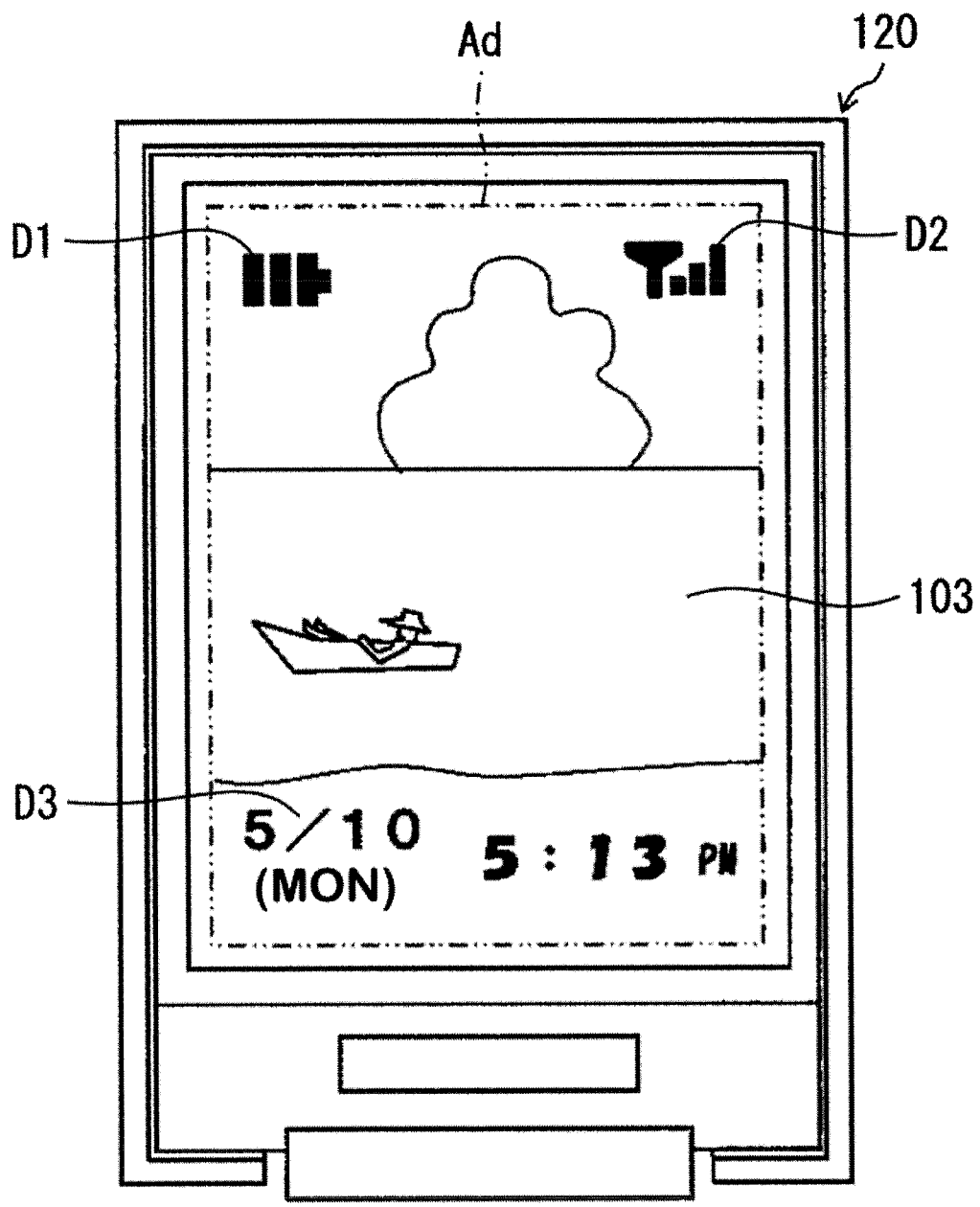
FIG. 18B is a plan view depicting a state where the background screen and the display panel simultaneously activated on said liquid crystal display device.

Devices in which the liquid crystal display devices 1A through 1D may be adopted are described with reference to FIGS. 15A, 15B, and 15C, and FIGS. 16A, 16B, 16C, and 16D. FIG. 15A illustrates a liquid crystal display device according to fifth embodiment and more specifically is a perspective view illustrating a configuration of an upper arm blood pressure meter which is an example of adopting the liquid crystal display device in health-related equipment; FIG. 15B is an exploded perspective view illustrating a configuration of the liquid crystal display device in the upper arm blood pressure meter; and FIG. 15C is a plan view illustrating a configuration of a body composition meter which is an example of adopting the liquid crystal display device in health-related equipment. FIG. 16A illustrates the liquid crystal display device and more specifically is a perspective view of the configuration of a microwave oven which is an example of adopting the liquid crystal display in an electrical home appliance; FIG. 16B is a perspective view of the configuration of a fan heater which is an example of adopting the liquid crystal display device in an electrical home appliance; FIG. 16C is a perspective view of the configuration of a rice cooker which is one example of adopting the liquid crystal display in an electrical home appliance; and FIG. 16D is a front view illustrating a configuration of a water heater which is an example of adopting the liquid crystal display device in an electrical home appliance.

A liquid crystal display devices 1A-1D of one or more of the above embodiments may be adopted in various of devices when the liquid crystal display device 1A-1D is equipped with a backlight 3 having a light guide 10A, 10D and a display panel 2 that effects presentation via liquid crystals that produce a monochrome image.

For instance, the liquid crystal display device 1A-1D may be adopted in health-related equipment that functions as an upper arm blood pressure meter as illustrated in FIGS. 15A and 15B. In this case, during normal use of the upper arm blood pressure meter, activating the liquid crystal display LED 4A, 4B effects a liquid-crystal display 2a of, for example, the blood pressure or the measurement time. However, a prescribed display EM may be presented, for instance, to prompt adjusting of the arm band and re-taking the measurement by, for example, presenting a character string "Please reapply the armband" with a graphic of the arm band when the measurement value is abnormal. In this case, the prescribed pattern EM, e.g., the character string "Please reapply the armband" and the graphic of the armband as when there is an abnormality cannot be seen during normal use of the upper arm blood pressure meter because the pattern display LED 5A, 5B is unactivated. Therefore, the upper arm blood pressure meter may be used normally without the prescribed display EM being identified.

Additionally, the liquid crystal display device 1A-1D of one or more of the above embodiments may be implemented by merely adding the pattern-display reflection patterns 13 to a light guide plate 10A, 10D in the backlight 3 of a conventional liquid crystal display device and adding the pattern display LED 5A, 5B. Accordingly, the liquid crystal display device 1A-1D of one or more of the above embodiments may be easily adopted in an upper arm blood pressure meter since only the backlight in the liquid crystal display device of a conventional upper arm blood pressure meter needs change to the backlight 3 in the liquid crystal display device 1A-1D of one or more of the above embodiments.

As illustrated in FIG. 15C, a similar type of health-related equipment, e.g., a body composition meter is also commercially available. This body composition meter shows weight or body fat as the liquid-crystal display 2a via the liquid crystals that produce a monochrome image. Therefore, the liquid crystal display device 1A-1D of one or more of the above embodiments can also be adopted in the body composition meter.

Additionally, health-related equipment may include, for example, pedometers, heart rate monitors, high-frequency therapy devices, and the like. These health-related devices also effect liquid-crystal display 2a via liquid crystals that produce a monochrome image and thus the liquid crystal display device 1A-1D of one or more of the above embodiments may be adopted therein.

The liquid crystal display device 1A-1D of one or more of the above embodiments is not limited to adoption in health-related devices. For instance, the liquid crystal display device 1A-1D of one or more of the above embodiments may be adopted in electrical home appliances that use monochromatic liquid crystal displays as illustrated in FIGS. 16A, 16B, 16C, and 16D. More specifically, the liquid crystal display device 1A-1D of one or more of the above embodiments may be adopted in electrical home appliances such as a microwave oven as illustrated in FIG. 16A; a fan heater as illustrated in FIG. 16B; a rice cooker as illustrated in FIG. 16C; a water heater as illustrated in FIG. 16D; or the like. Beyond these, the liquid crystal display device 1A-1D of one or more of the above embodiments may be adopted in, for instance, an oven or a digital watch.

In other words, the liquid crystal display device 1A-1D of one or more of the above embodiments may be adopted in general in devices, such as the aforementioned health-related devices, electrical appliances, and the like that use liquid crystals that produced a monochrome image to effect a fixed image via a segmented liquid crystal display The present invention is not limited to each of the above described embodiments and may be modified in various ways and remain within the scope of the claims. The technical means disclosed in each of the different embodiments may be combined as appropriate, and an embodiment obtained in such a manner remains within the technical scope of the present invention. Finally, a combination of the technical means described with each of the embodiments may also create new technical features.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A display device configured for use as a backlight for a display panel that effects presentation via liquid crystals that produce a monochrome image, the display device comprising:
 a light guide plate;
 a first light source and a second light source arranged at an edge of the light guide plate; and
 a controller that controls the activation of the first light source and the second light source;
 wherein the light guide plate comprises:
 an emission surface,
 a cluster of first reflective structures configured to reflect light incident thereon from the first light source thereby changing the optical path of the light, and causing the light to exit from the emission surface to serve as the backlight and effecting only the presentation via the liquid crystals, and
 a cluster of second reflective structures configured to reflect light incident thereon from a second light source thereby changing the optical path of the light and causing the light to exit from the emission surface to effect only a predetermined display without effecting any presentation via the liquid crystals, and
 wherein the controller is capable of activating the first light source alone, the second light source alone and both the first light source and the second light source together.

2. The display device according to claim 1,
 wherein the second light source includes a plurality of sectional light sources,
 wherein the cluster of second reflective structures include a plurality of reflection sub-clusters with each reflection sub-cluster configured to correspond to a sectional light source, and wherein each of the reflection sub-clusters presents a different pattern.

3. The display device according to claim 2, wherein a size of each component in the cluster of first reflective structures in a predetermined region on the light guide plate is smaller than the size of each component in the cluster of first reflective structures outside the predetermined region when the cluster of first reflective structures and the cluster of second reflective structures are mixed together in the predetermined region.

4. The display device according to claim 2, wherein the cluster of second reflective structures is made up of a plurality of recesses drilled into the back surface of the light guide plate where the recesses are spindle shaped when viewed from a direction perpendicular to the emission surface.

5. The display device according to claim 1, wherein a size of each component in the cluster of first reflective structures in a predetermined region on the light guide plate is smaller than the size of each component in the cluster of first reflective structures outside the predetermined region when the cluster of first reflective structures and the cluster of second reflective structures are mixed together in the predetermined region.

6. The display device according to claim 5, wherein the cluster of second reflective structures is made up of a plurality of recesses drilled into the back surface of the light guide plate where the recesses are spindle shaped when viewed from a direction perpendicular to the emission surface.

7. The display device according to claim 1, wherein the cluster of second reflective structures is made up of a plurality of recesses drilled into the back surface of the light guide plate where the recesses are spindle shaped when viewed from a direction perpendicular to the emission surface.

8. The display device according to claim 7, wherein a reflection surface in the cluster of second reflective structures is parallel to the direction along which the birefringence of the light guide plate changes.

9. The display device according to claim 1, wherein the first light source and the second light source emit light of mutually different colors.

10. The display device according to claim 1, wherein the cluster of second reflective structures on the light guide plate is configured to present the predetermined display on the emission surface of the light guide plate with the predetermined display configured for external viewing through a display panel.

11. The display device according to claim 1, wherein the cluster of second reflective structures on the light guide plate present the predetermined display in front of a display panel.

12. The display device according to claim 1, wherein the controller is configured to switch between and activate the first light source and the second light source.

13. A liquid crystal display device comprising:
a display device according to claim 1 configured to serve as a backlight; and
a display panel arranged in front of the backlight and configured to effect presentation via liquid crystals that produce a monochrome image.

14. The liquid crystal display device according to claim 13, wherein the display panel is driven in normally white mode.

15. The liquid crystal display device according to claim 13, further comprising:
a diffusion plate arranged between the light guide plate and the display panel, and configured to diffuse light.

16. The liquid crystal display device according to claim 13, further comprising:
a reflection plate arranged at the rear surface of the light guide plate which is opposite the display panel, the reflection plate configured to return light leaving the light guide plate from the rear surface back to the light guide plate.

* * * * *